United States Patent
Park et al.

(10) Patent No.: US 10,764,951 B2
(45) Date of Patent: Sep. 1, 2020

(54) REGISTRATION METHOD OF USER TERMINAL IN WIRELESS COMMUNICATION SYSTEM AND APPARATUS THEREFOR

(71) Applicant: LG ELECTRONICS INC., Seoul (KR)

(72) Inventors: Sangmin Park, Seoul (KR); Jinsook Ryu, Seoul (KR); Myungjune Youn, Seoul (KR); Hyunsook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/064,254

(22) PCT Filed: Jun. 18, 2018

(86) PCT No.: PCT/KR2018/006848
§ 371 (c)(1),
(2) Date: Sep. 21, 2018

(87) PCT Pub. No.: WO2018/231028
PCT Pub. Date: Dec. 20, 2018

(65) Prior Publication Data
US 2019/0029065 A1    Jan. 24, 2019

Related U.S. Application Data

(60) Provisional application No. 62/521,384, filed on Jun. 17, 2017.

(51) Int. Cl.
*H04W 76/18* (2018.01)
*H04W 12/06* (2009.01)
(Continued)

(52) U.S. Cl.
CPC ............. *H04W 76/18* (2018.02); *H04W 8/02* (2013.01); *H04W 8/08* (2013.01); *H04W 12/06* (2013.01);
(Continued)

(58) Field of Classification Search
CPC ..... H04W 48/18; H04W 60/00; H04W 12/06; H04W 76/11
See application file for complete search history.

(56) References Cited

U.S. PATENT DOCUMENTS

| 2017/0048330 A1 | 2/2017 | Montemurro et al. |
| 2017/0164349 A1 | 6/2017 | Zhu et al. |

(Continued)

FOREIGN PATENT DOCUMENTS

| KR | 10-2014-0005304 A | 1/2014 |
| KR | 10-2014-0146819 A | 12/2014 |

(Continued)

OTHER PUBLICATIONS

Author Unknown, TS 23.501 v 1.0.0, Jun. 1, 2017, pp. 1-146) (Year: 2017).*

(Continued)

*Primary Examiner* — Christopher M Crutchfield
(74) *Attorney, Agent, or Firm* — Birch, Stewart, Kolasch & Birch, LLP

(57) ABSTRACT

In an aspect of the present invention, a method for a user equipment to update a policy in a wireless communication system may include transmitting a first registration request message to an access and mobility management function (AMF), wherein the first registration request message includes requested network slice selection assistance information (NSSAI) including single (S)-NSSAI corresponding to a network slice with which the user equipment wants to register; receiving a first registration accept message as a (Continued)

response to the first registration request message from the AMF, wherein the first registration accept message includes an allowed NSSAI including at least one S-NSSAI allowed by the AMF; and requesting the update of a network slice selection policy (NSSP) associated with new S-NSSAI from the AMF when the new S-NSSAI not included in the requested NSSAI is included in the allowed NSSAI and the NSSP associated with the new S-NSSAI is not present.

12 Claims, 15 Drawing Sheets

(51) Int. Cl.
| | |
|---|---|
| *H04W 76/27* | (2018.01) |
| *H04W 8/08* | (2009.01) |
| *H04W 48/18* | (2009.01) |
| *H04W 60/06* | (2009.01) |
| *H04W 8/02* | (2009.01) |
| *H04W 60/00* | (2009.01) |
| *H04W 8/22* | (2009.01) |
| *H04W 4/70* | (2018.01) |
| *H04W 80/08* | (2009.01) |
| *H04W 84/04* | (2009.01) |

(52) U.S. Cl.
CPC ........... *H04W 48/18* (2013.01); *H04W 60/00* (2013.01); *H04W 60/06* (2013.01); *H04W 76/27* (2018.02); *H04W 4/70* (2018.02); *H04W 8/22* (2013.01); *H04W 80/08* (2013.01); *H04W 84/042* (2013.01)

(56) References Cited

U.S. PATENT DOCUMENTS

| | | | | |
|---|---|---|---|---|
| 2017/0303259 | A1* | 10/2017 | Lee | H04W 28/16 |
| 2017/0367036 | A1 | 12/2017 | Chen et al. | |
| 2018/0227826 | A1* | 8/2018 | Abraham | H04L 63/0457 |
| 2019/0007500 | A1 | 1/2019 | Kim et al. | |
| 2019/0029065 | A1 | 1/2019 | Park et al. | |
| 2019/0053102 | A1 | 2/2019 | Oohira et al. | |
| 2019/0149998 | A1* | 5/2019 | Yang | H04W 16/04 |
| 2019/0159117 | A1 | 5/2019 | Kuge et al. | |
| 2019/0223093 | A1* | 7/2019 | Watfa | H04W 36/06 |
| 2019/0230556 | A1 | 7/2019 | Lee | |
| 2019/0261159 | A1* | 8/2019 | Wang | H04W 8/08 |
| 2019/0313473 | A1 | 10/2019 | Kim et al. | |
| 2019/0357130 | A1 | 11/2019 | Garcia Azorero et al. | |
| 2020/0059989 | A1 | 2/2020 | Velev et al. | |

FOREIGN PATENT DOCUMENTS

| | | |
|---|---|---|
| KR | 10-2017-0030058 A1 | 3/2017 |
| WO | WO 2017/086848 A1 | 5/2017 |

OTHER PUBLICATIONS

3GPP, "3rd Generation Partnership Project; Technical Specification Group Services and System Aspects; System Architecture for the 5G System; Stage 2 (Release 15)," 3GPP TS 23.501, V1.0.0, Jun. 2017, pp. 1-145.
HTC, "Handling of Allowed NSSAI," SA WG2 Temporary Document, Meeting #191, S2-173430, Hangzhou, P. R. China, May 15-19, 2017, pp. 1-2.
Motorola Mobility et al., "Allowed NSSAI Usage Information," SA WG2 Temporary Document, Meeting #S2-121, S2-173291, Hangzhou, P. R. China, May 15-19, 2017, pp. 1-3.
Motorola Mobility et al., "Interim Agreement: Determination of NSSAI Based on UE Policy," SA WG2 Temporary Document, Meeting #118, S2-166603, Reno, Nevada, Nov. 14-28, 2016, pp. 1-3.
Nokia et al., "On Providing Allowed NSSAI to the RAN in Registration Procedure," SA WG2 Temporary Document, Meeting #121, S2-173450, Hang Zhou, China, May 15-19, 2017, pp. 1-8.
Qualcomm Incorporated et al., "TS 23.501: Slice Co-Existence and Conflicting S-NSSAIs," SA WG2 Temporary Document, Meeting #121, S2-173103, Hangzhou, P. R. China, May 15-19, 2017, pp. 1-8.
LG Electronics Inc., "Network Slice Selection Considering Authentication and Authorization," SA WG2 Temporary Document, Meeting #116, S2-163395, Vienna, Australia, Jul. 11-15, 2016, pp. 1-6.
Samsung, "Single Value of NSSAI in RRC for CCNF (AMF) Selection," SA WG2 Temporary Document, Meeting #119, S2-171153, Dubrovnik, Croatia, Feb. 13-17, 2017, pp. 1-3.

* cited by examiner

[Fig. 1]
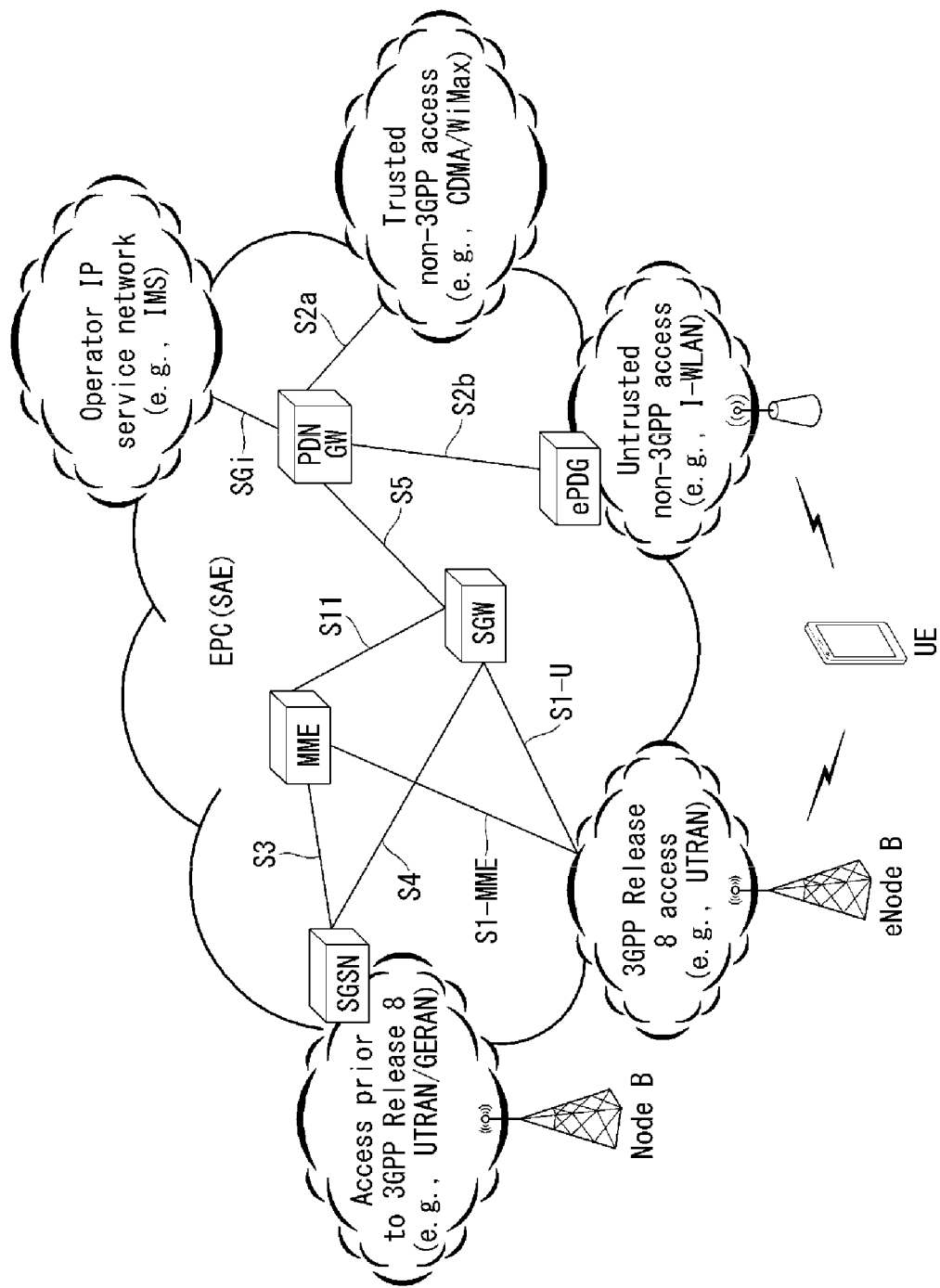

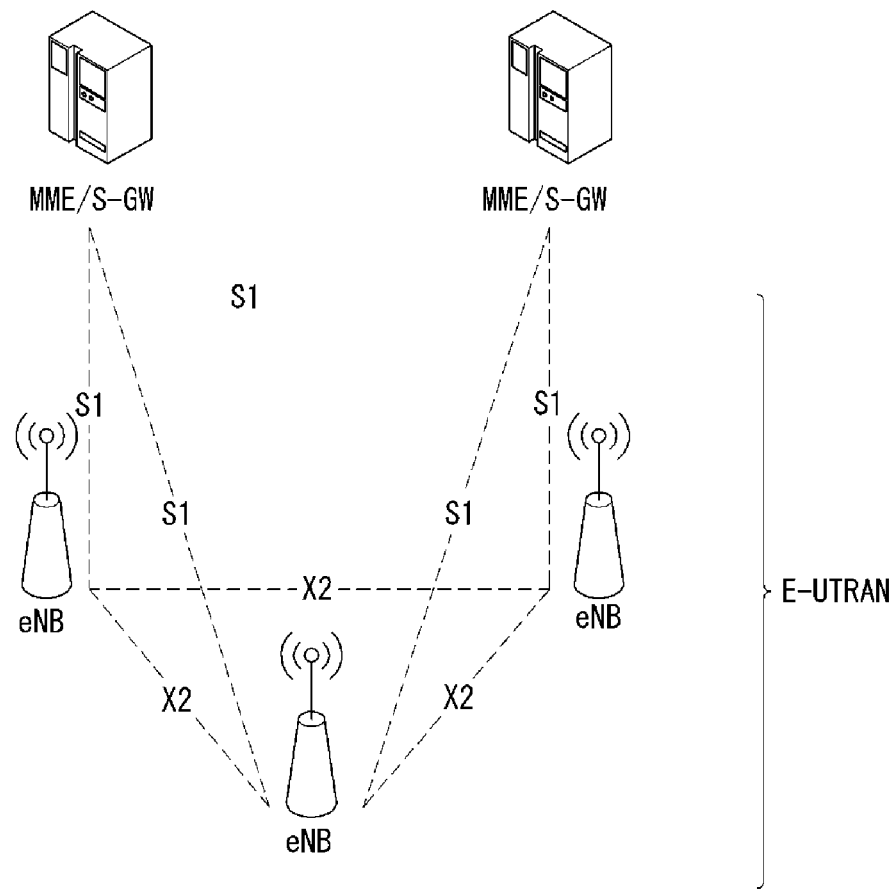
[Fig. 2]

[Fig. 3]
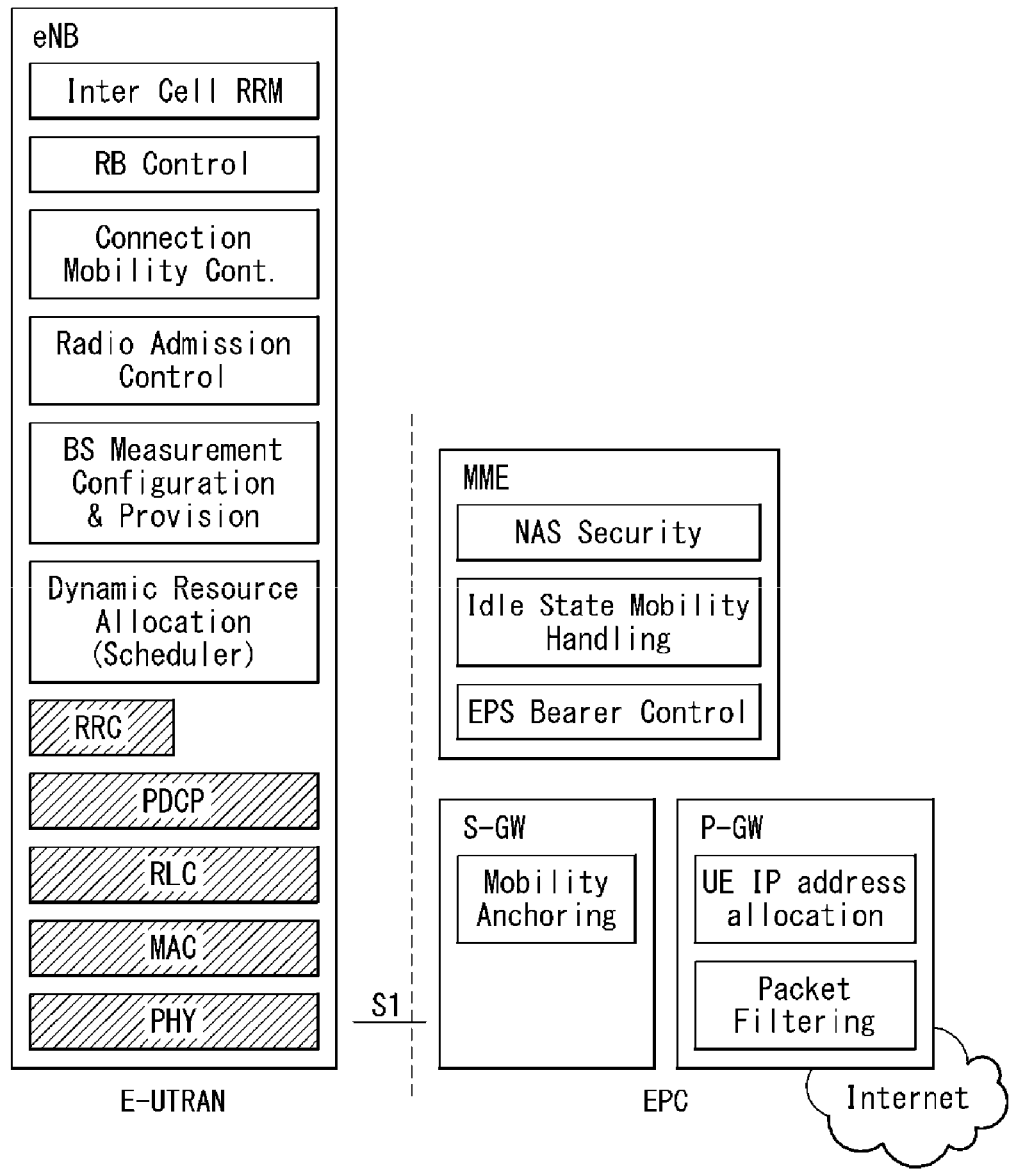

[Fig. 4]
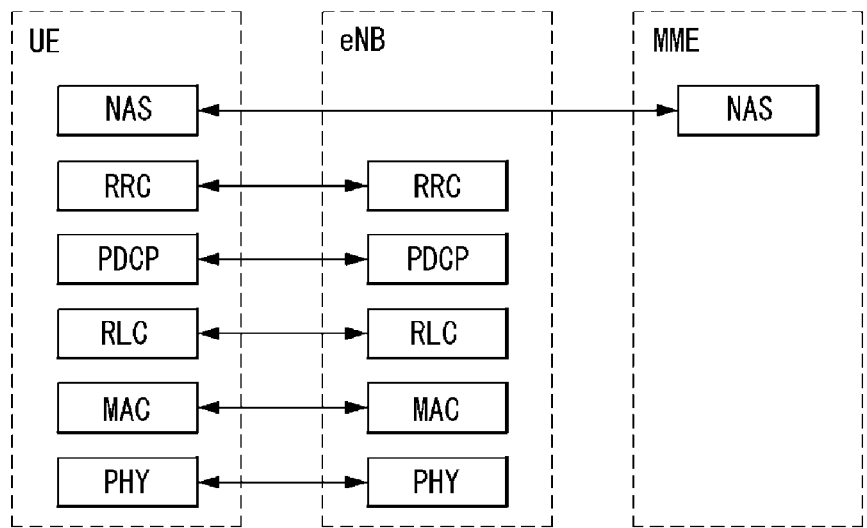
(a) Control plane protocol stack
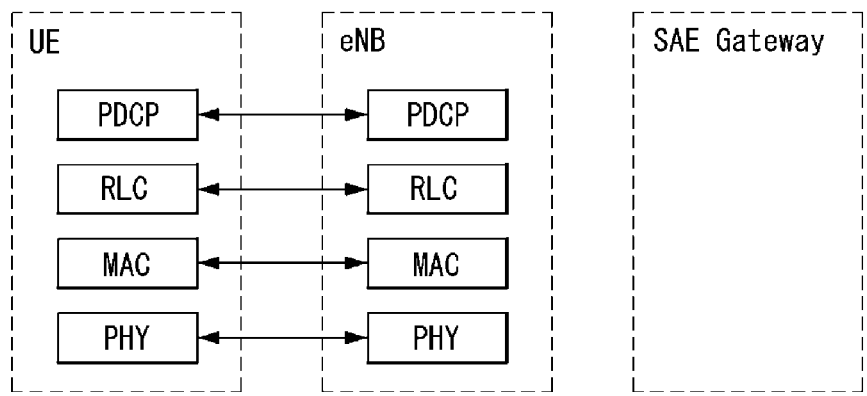
(b) User plane protocol stack

[Fig. 5]
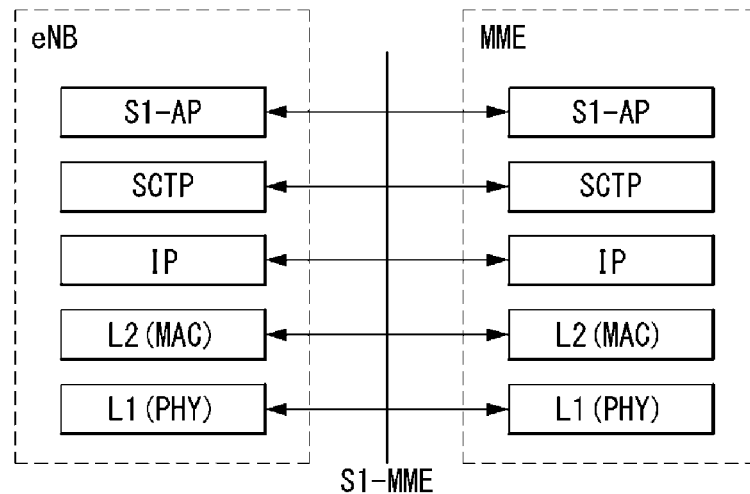
(a) control-plane protocol stack
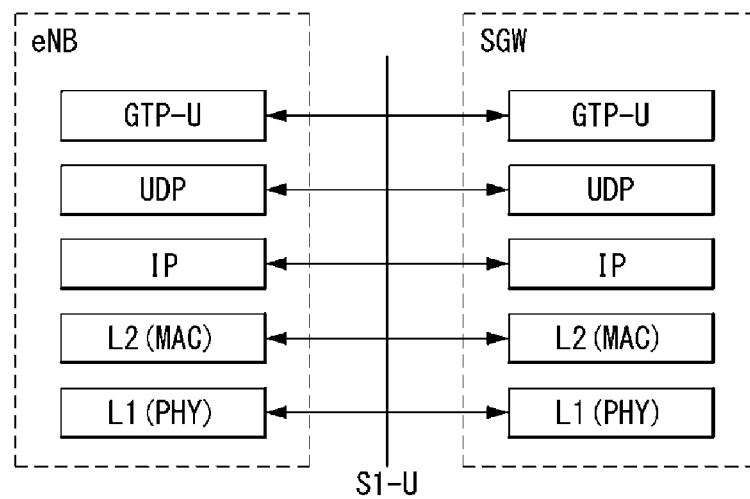
(b) user-plane protocol stack

[Fig. 6]
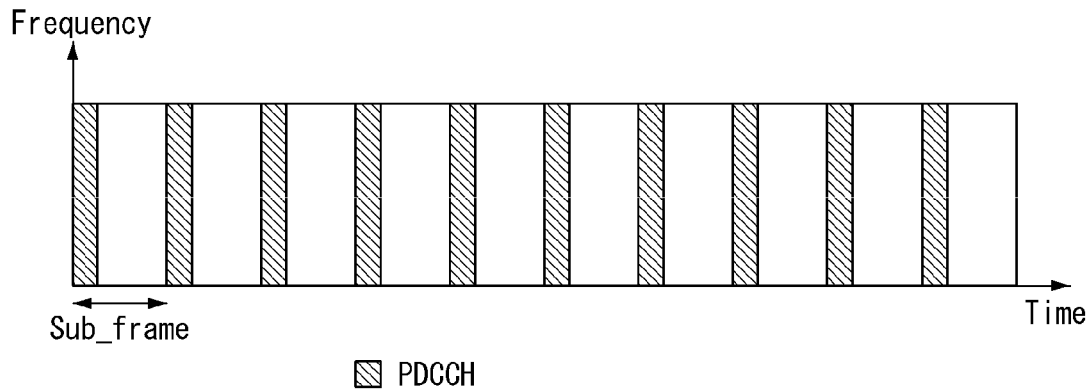
[Fig. 7]
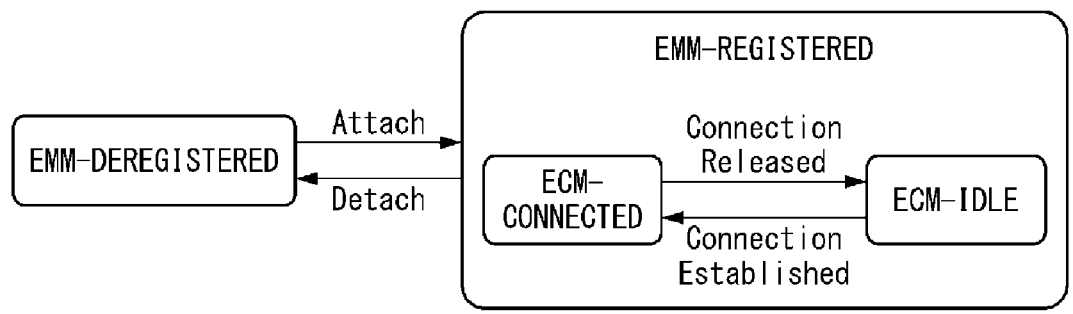
[Fig. 8]
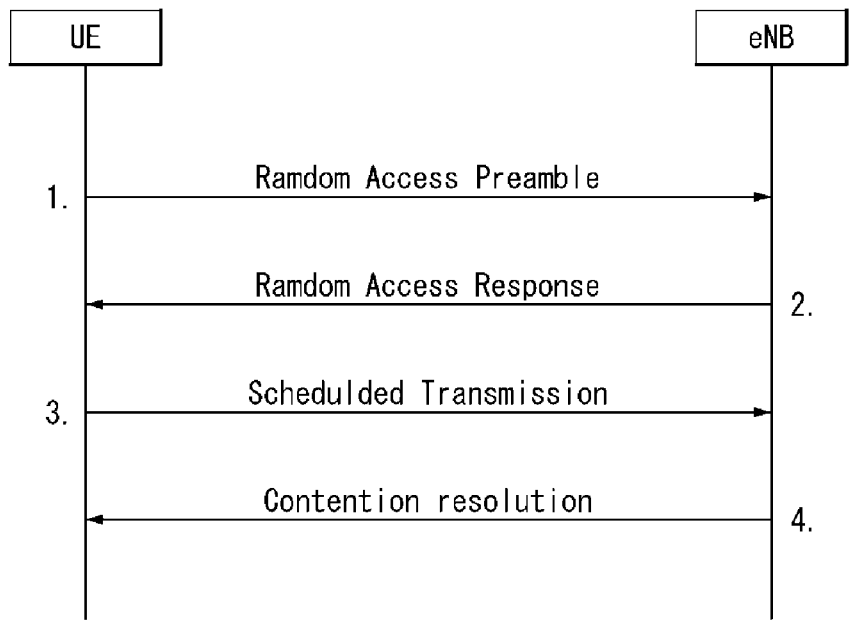

[Fig. 9]
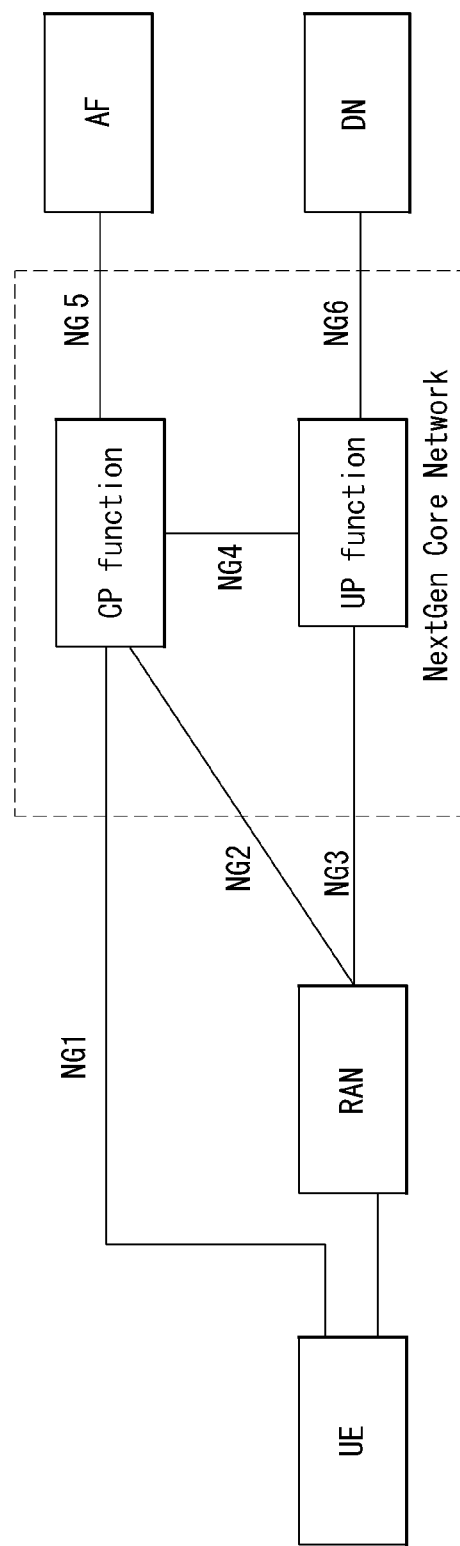

[Fig. 10]
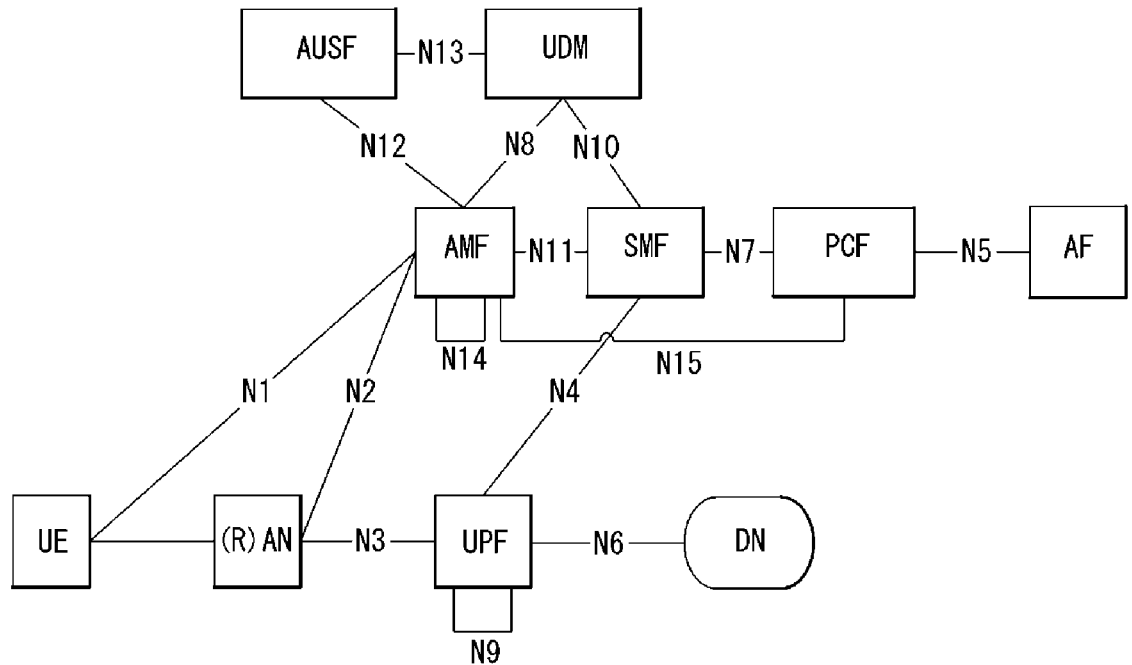
[Fig. 11]
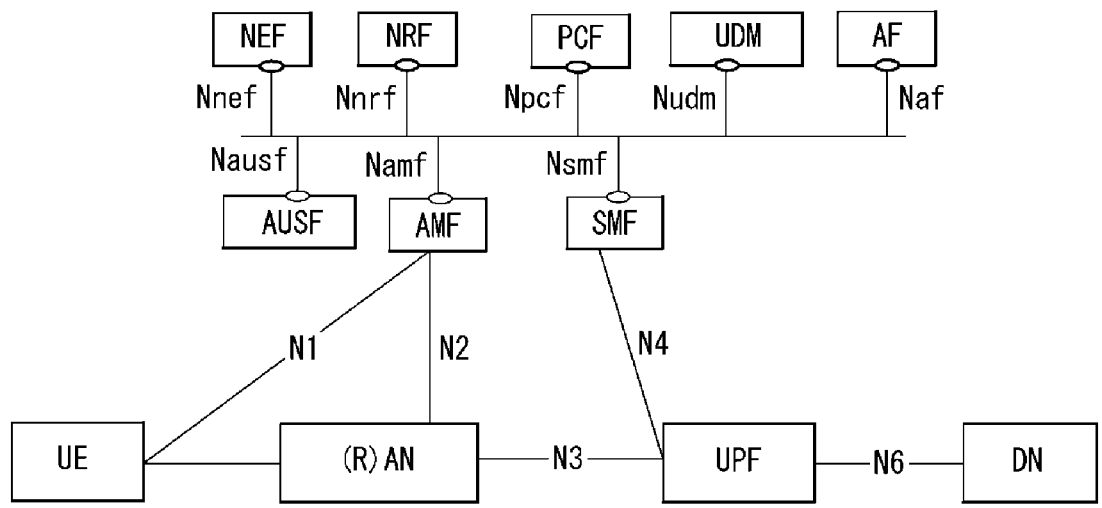

[Fig. 12]
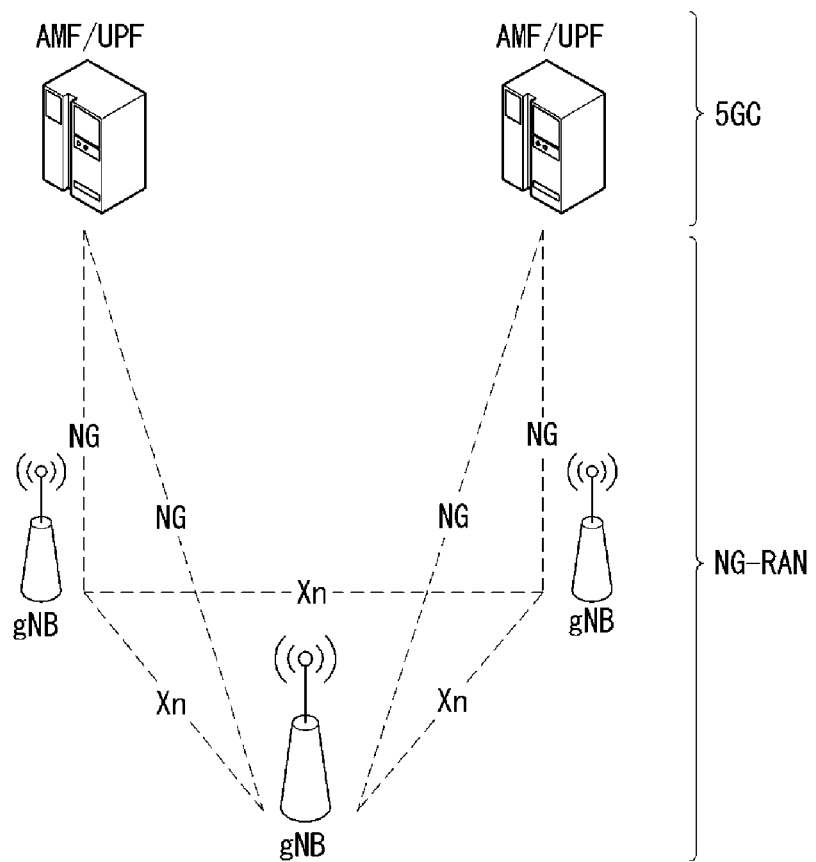

[Fig. 13]
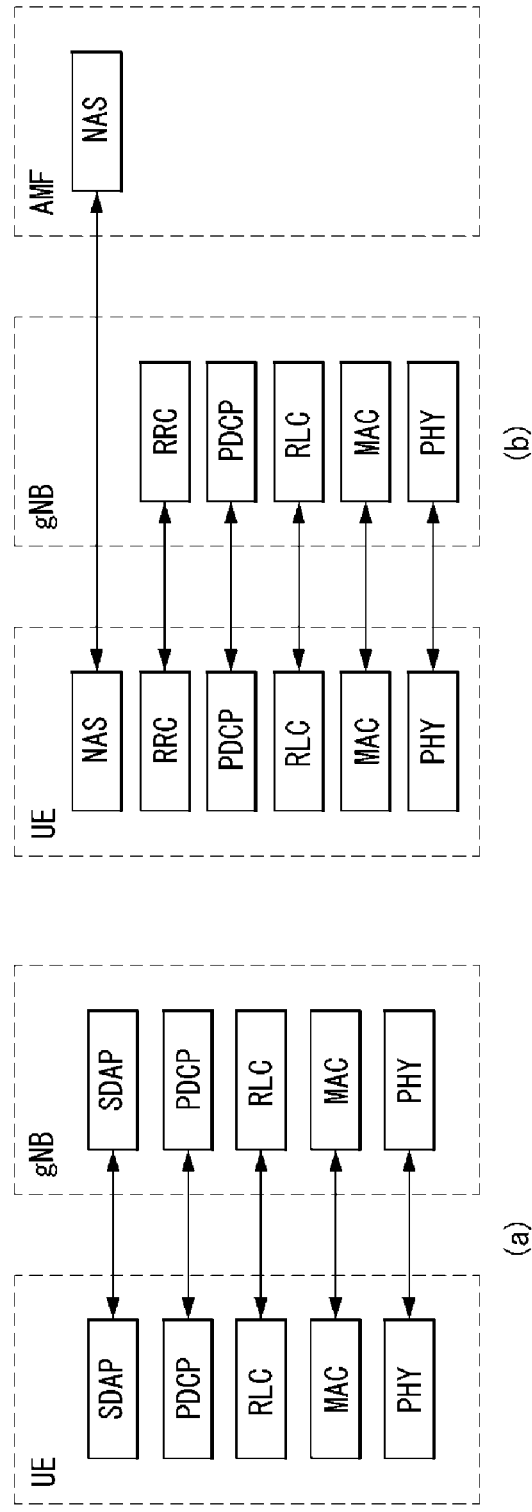

[Fig. 14]
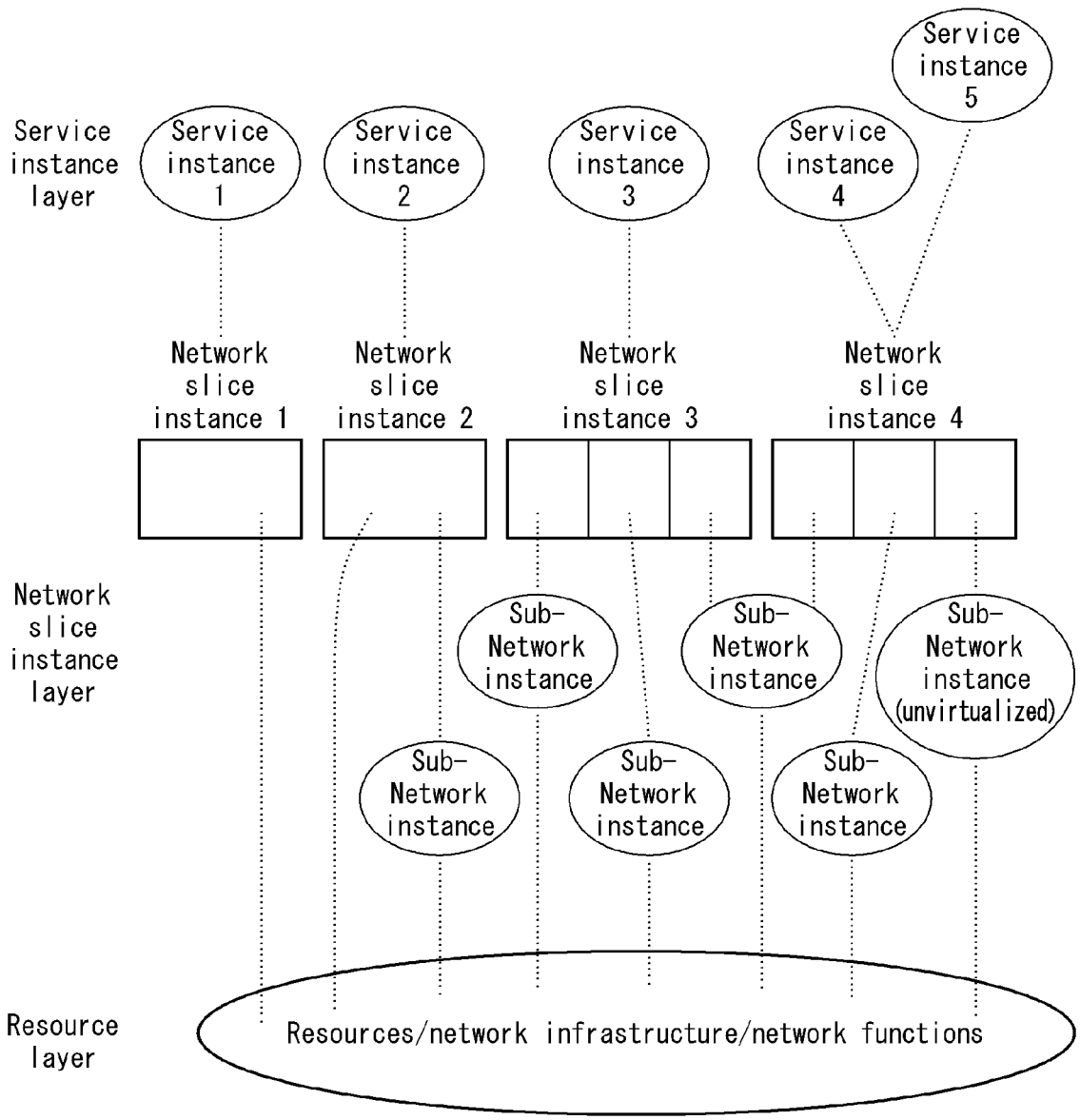
[Fig. 15]
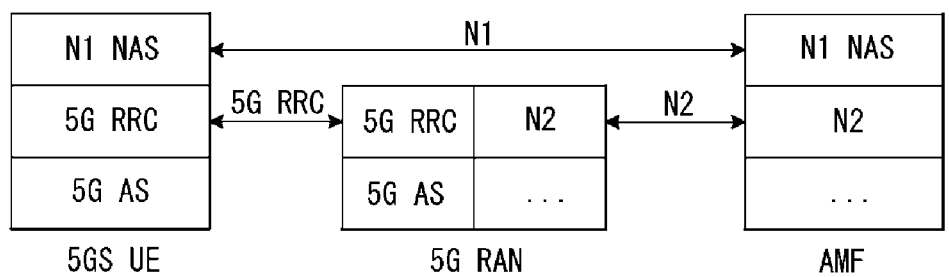

[Fig. 16]
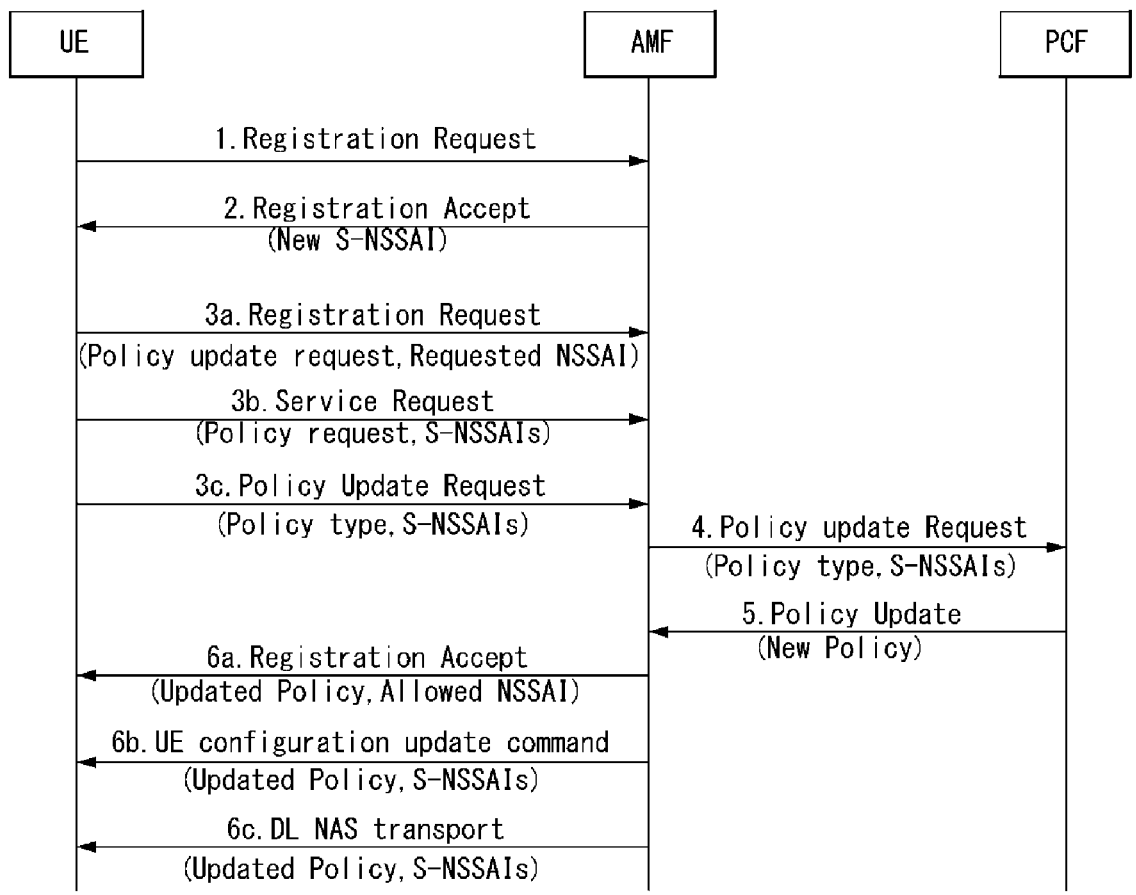

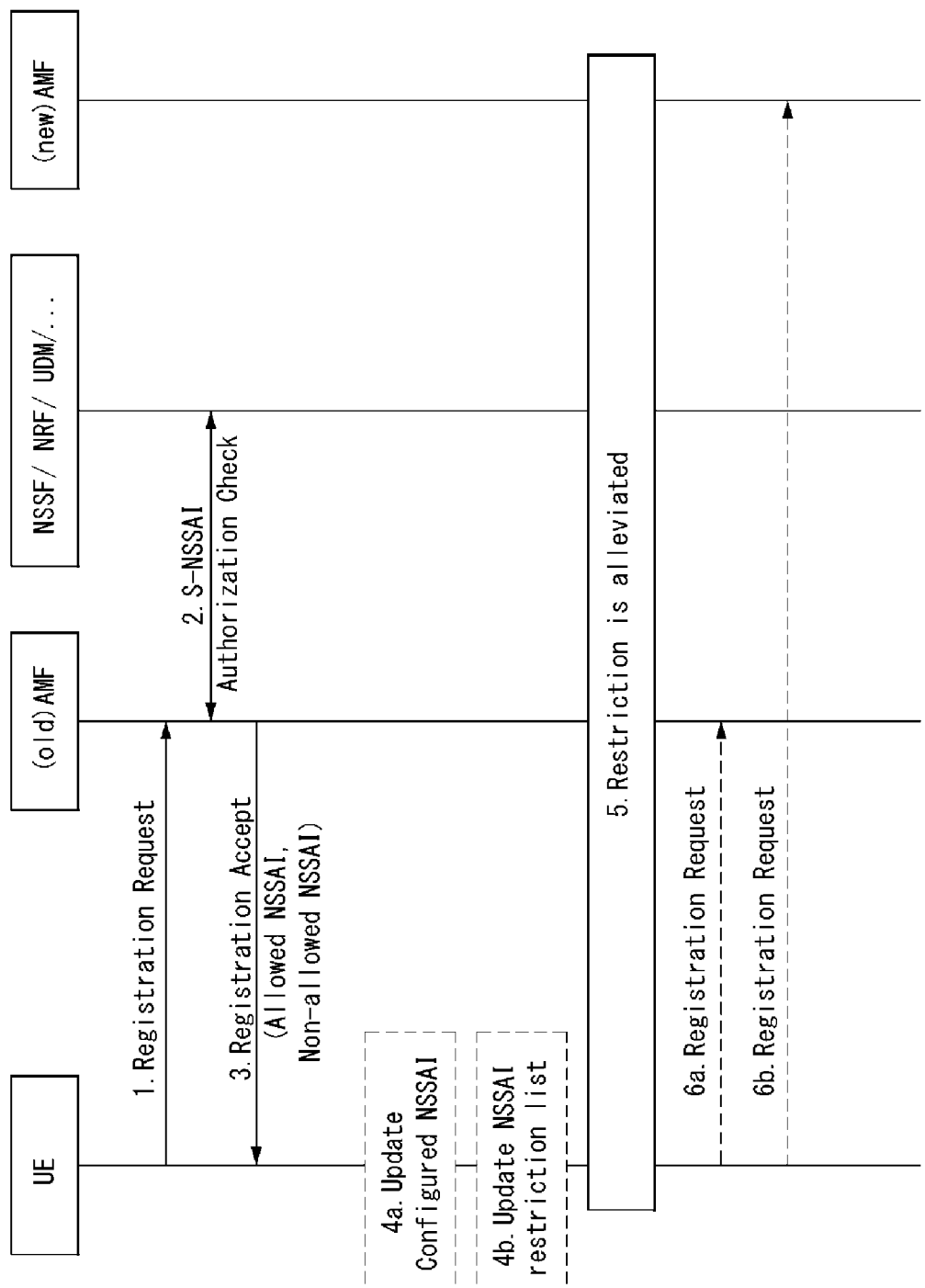

[Fig. 18]
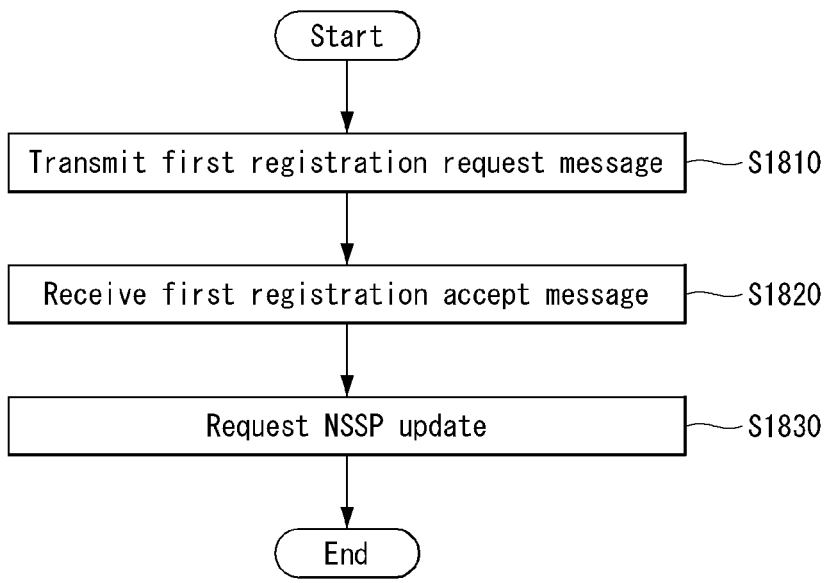
[Fig. 19]
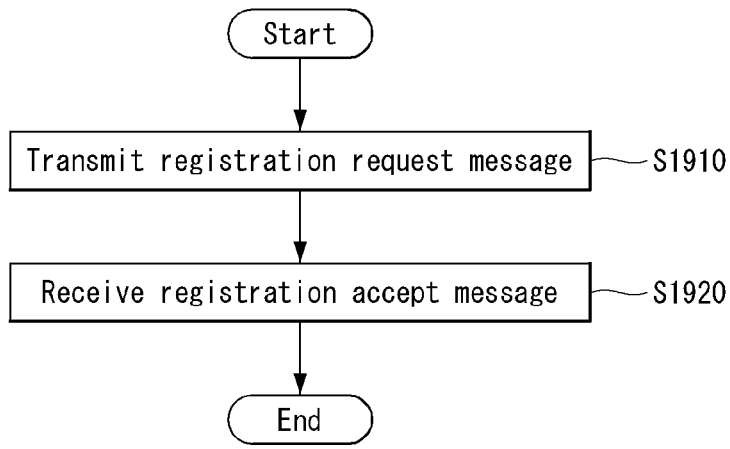
[Fig. 20]
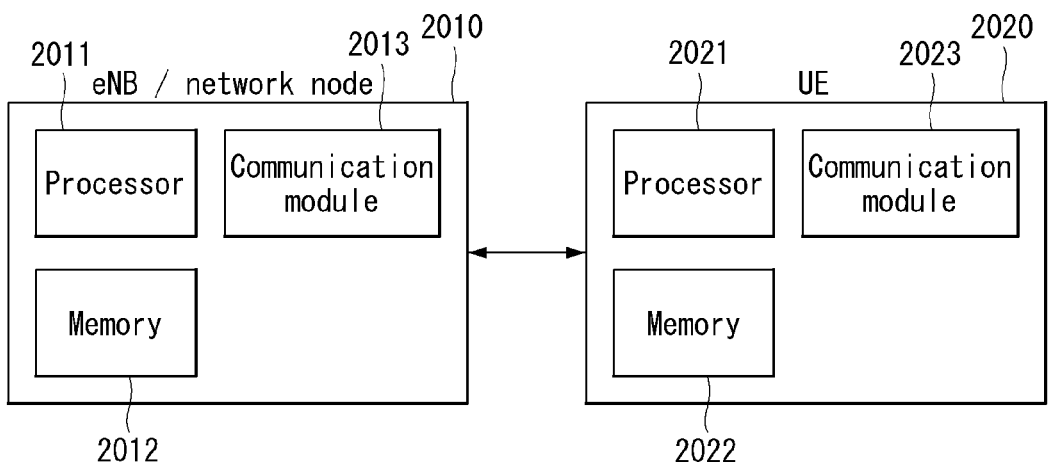

[Fig. 21]
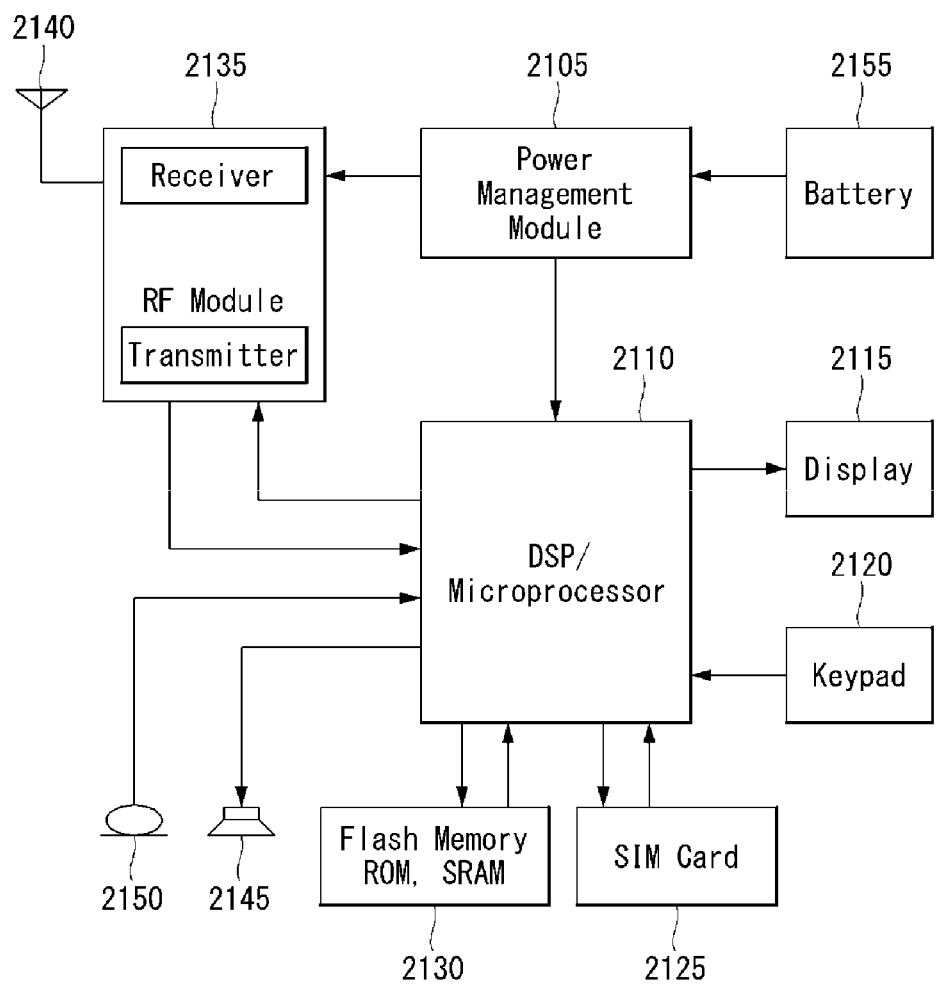

REGISTRATION METHOD OF USER TERMINAL IN WIRELESS COMMUNICATION SYSTEM AND APPARATUS THEREFOR

CROSS REFERENCE TO RELATED APPLICATIONS

This application is the National Phase of PCT International Application No. PCT/KR2018/006848, filed on Jun. 18, 2018, which claims priority under 35 U.S.C. 119(e) to U.S. Provisional Application No. 62/521,384, filed on Jun. 17, 2017, all of which are hereby expressly incorporated by reference into the present application.

TECHNICAL FIELD

The present invention relates to a wireless communication system and, more particularly, to a method of a user equipment to update a policy and an apparatus therefor.

BACKGROUND ART

A mobile communication system has been developed to provide a voice service while guaranteeing activity of a user. However, the mobile communication system extends an area up to a data service as well as a voice and at present, a short phenomenon of a resource is caused due to an explosive increase of traffic and uses require a higher-speed service, and as a result, a more developed mobile communication system is required.

Requirements of a next-generation mobile communication system largely need to support accommodation of explosive data traffic, an epochal increase of transmission rate per user, accommodation of the significantly increased number of connection devices, very low end-to-end latency, and high energy efficiency. To this end, various technologies have been researched, which include dual connectivity, massive multiple input multiple output (MIMO), in-band full duplex, non-orthogonal multiple access (NOMA), super wideband supporting, device networking, and the like.

Particularly, for the device in which power consumption significantly influences on the life of the device, various techniques for decreasing the power consumption has been vigorously developed.

DISCLOSURE

Technical Problem

An object of the present invention is to prevent a service use restriction situation of a user equipment which may occur when slice information (Requested NSSAI) requested by the user equipment and slice information (Allowed NSSAI) allowed by a network mismatch.

Specifically, an object of the present invention is to propose an efficient method for requesting a specific service/slice/S-NSSAI of a user equipment from a network in the user equipment and network node aspect.

Specifically, an object of the present invention is to propose an efficient policy update request method of a user equipment in the user equipment and network node aspects.

Embodiments regarding a method and apparatus for solving the aforementioned technical objects are proposed. Technical objects to be achieved in the present invention are not limited to the aforementioned technical objects, and other technical objects not described above may be evidently understood by a person having ordinary skill in the art to which the present invention pertains from the following description.

Technical Solution

In an aspect of the present invention, a method for a user equipment to update a policy in a wireless communication system may include transmitting a first registration request message to an access and mobility management function (AMF), wherein the first registration request message includes requested network slice selection assistance information (NSSAI) including single (S)-NSSAI corresponding to a network slice with which the user equipment wants to register; receiving a first registration accept message as a response to the first registration request message from the AMF, wherein the first registration accept message includes an allowed NSSAI including at least one S-NSSAI allowed by the AMF; and requesting the update of a network slice selection policy (NSSP) associated with new S-NSSAI from the AMF when the new S-NSSAI not included in the requested NSSAI is included in the allowed NSSAI and the NSSP associated with the new S-NSSAI is not present.

Furthermore, the AMF may be a network node for transmitting a policy update request message for the update of the NSSP to a policy control function (PCF) in response to a request from the user equipment. The PCF may be a network node for delivering a policy update message including NSSP update information about the new S-NSSAI to the AMF in response to a request from the AMF.

Furthermore, the policy update request message may include the new S-NSSAI to request update and/or a policy type.

Furthermore, the requesting the update of the NSSP associated with the new S-NSSAI from the AMF may include transmitting a second registration request message including "the new S-NSSAI" and "a registration type configured as a policy update type or an indicator indicative of a policy update" to the AMF.

Furthermore, the requested NSSAI included in the second registration request message may include all of allowed NSSAIs stored in the user equipment.

Furthermore, the NSSP update information transmitted by the PCF may be transmitted to the user equipment through a second registration reception message which is a response message for the second registration request message.

Furthermore, the method of a user equipment to update a policy may further include updating the NSSP for the new S-NSSAI based on the NSSP update information received through the second registration request message.

Furthermore, the requesting the update of the NSSP associated with the new S-NSSAI from the AMF may include transmitting a service request or policy update request message including "the new S-NSSAI" and "a request type configured to a policy update type or an indicator indicative of a policy update" to the AMF.

Furthermore, when the update request of the NSSP is transmitted through the service request message and the user equipment which transmits the service request message is in a connection management (CM)-IDLE state, the AMF is a network node performing initial context setup or N2 connection setup for the user equipment.

Furthermore, the transmission of the update request of the NSSP through the policy update request message is limited to a case where a CM state of the user equipment is a CM-CONNECTED state.

Furthermore, the NSSP update information transmitted by the PCF may be transmitted to the user equipment through a generic user equipment configuration update command message or a downlink non-access stratum (NAS) transport message.

Furthermore, in another aspect of the present invention, a user equipment performing policy update in a wireless communication system includes a communication module configured to transmit and receive signals and a processor configured to control the communication module. The processor may be further configured to transmits a first registration request message to an access and mobility management function (AMF), wherein the first registration request message may include a requested network slice selection assistance information (NSSAI) including single (S)-NSSAI corresponding to a network slice with which the user equipment wants to register, receive a first registration accept message as a response to the first registration request message from the AMF, wherein the first registration accept message may include allowed NSSAI including at least one S-NSSAI allowed by the AMF, and request the update of a network slice selection policy (NSSP) associated with new S-NSSAI from the AMF when the new S-NSSAI not included in the requested NSSAI is included in the allowed NSSAI and the NSSP associated with the new S-NSSAI is not present.

Furthermore, the AMF may be a network node for transmitting a policy update request message for the update of the NSSP to a policy control function (PCF) in response to a request from the user equipment. The PCF may be a network node for delivering a policy update message including NSSP update information about the new S-NSSAI to the AMF in response to a request from the AMF.

Furthermore, the policy update request message may include the new S-NSSAI to request update and/or a policy type.

Advantageous Effects

An embodiment of the present invention has an advantage in that services can be provided to a UE more efficiently by preventing a service use restriction situation of the UE which may occur when slice information (Requested NSSAI) requested by a UE and slice information (Allowed NSSAI) allowed by a network are mismatched if network slicing is used in a 5G network through the present invention.

The effects obtained by the present invention are not limited to the effects mentioned above, and other effects not mentioned can be clearly understood by those skilled in the art from the following description.

DESCRIPTION OF DRAWINGS

The accompanying drawings, which are included to provide a further understanding of the invention as a part of detailed descriptions, illustrate embodiment(s) of the invention and together with the descriptions, serve to explain the technical principles of the invention.

FIG. 1 illustrates an Evolved Packet System (EPS) to which the present invention can be applied.

FIG. 2 illustrates one example of an Evolved Universal Terrestrial Radio Access Network (E-UTRAN) to which the present invention can be applied.

FIG. 3 illustrates structures of an E-UTRAN and an EPC in a wireless communication system to which the present invention may be applied.

FIG. 4 illustrates a radio interface protocol structure between a UE and an E-UTRAN in a wireless communication system to which the present invention may be applied.

FIG. 5 illustrates an S1 interface protocol structure in a wireless communication system to which the present invention may be applied.

FIG. 6 illustrates a physical channel structure in a wireless communication system to which the present invention may be applied.

FIG. 7 illustrates an EMM and ECM states in a wireless communication system to which the present invention may be applied.

FIG. 8 illustrates a contention-based random access procedure in a wireless communication system to which the present invention may be applied.

FIG. 9 is a diagram illustrating 5G system architecture to which the present invention may be applied.

FIG. 10 illustrates a 5G system architecture using reference point representation.

FIG. 11 illustrates a 5G system architecture using a service-based representation.

FIG. 12 illustrates an NG-RAN architecture to which the present invention may be applied.

FIG. 13 illustrates a wireless protocol stack to which the present invention may be applied.

FIG. 14 is a diagram illustrating a network slicing concept according to an embodiment of the present invention.

FIG. 15 illustrates a protocol stack between a UE-core network of a 5G/NR system to which the present invention may be applied.

FIG. 16 is a flowchart illustrating a registration procedure according to an invention proposal 1 of this specification.

FIG. 17 is a flowchart illustrating a registration procedure according to Invention Proposal 2 of this specification.

FIG. 18 is a flowchart illustrating a policy update procedure/method of a UE according to Proposal 1 of the present invention.

FIG. 19 is a flowchart illustrating a registration procedure/method of a UE according to the proposal 2 of the present invention.

FIG. 20 illustrates a block diagram of a communication device according to an embodiment of the present invention.

FIG. 21 illustrates a block diagram of a communication device according to an embodiment of the present invention.

MODE FOR INVENTION

In what follows, preferred embodiments according to the present invention will be described in detail with reference to appended drawings. The detailed descriptions provided below together with appended drawings are intended only to explain illustrative embodiments of the present invention, which should not be regarded as the sole embodiments of the present invention. The detailed descriptions below include specific information to provide complete understanding of the present invention. However, those skilled in the art will be able to comprehend that the present invention can be embodied without the specific information.

For some cases, to avoid obscuring the technical principles of the present invention, structures and devices well-known to the public can be omitted or can be illustrated in the form of block diagrams utilizing fundamental functions of the structures and the devices.

A base station in this document is regarded as a terminal node of a network, which performs communication directly with a UE. In this document, particular operations regarded to be performed by the base station may be performed by a upper node of the base station depending on situations. In other words, it is apparent that in a network consisting of a plurality of network nodes including a base station, various operations performed for communication with a UE can be performed by the base station or by network nodes other than the base station. The term Base Station (BS) can be replaced with a fixed station, Node B, evolved-NodeB (eNB), Base Transceiver System (BTS), or Access Point (AP). Also, a terminal can be fixed or mobile; and the term can be replaced with User Equipment (UE), Mobile Station (MS), User Terminal (UT), Mobile Subscriber Station (MSS), Subscriber Station (SS), Advanced Mobile Station (AMS), Wireless Terminal (WT), Machine-Type Communication (MTC) device, Machine-to-Machine (M2M) device, or Device-to-Device (D2D) device.

In what follows, downlink (DL) refers to communication from a base station to a terminal, while uplink (UL) refers to communication from a terminal to a base station. In downlink transmission, a transmitter can be part of the base station, and a receiver can be part of the terminal. Similarly, in uplink transmission, a transmitter can be part of the terminal, and a receiver can be part of the base station.

Specific terms used in the following descriptions are introduced to help understanding the present invention, and the specific terms can be used in different ways as long as it does not leave the technical scope of the present invention.

The technology described below can be used for various types of wireless access systems based on Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), or Non-Orthogonal Multiple Access (NOMA). CDMA can be implemented by such radio technology as Universal Terrestrial Radio Access (UTRA) or CDMA2000. TDMA can be implemented by such radio technology as Global System for Mobile communications (GSM), General Packet Radio Service (GPRS), or Enhanced Data rates for GSM Evolution (EDGE). OFDMA can be implemented by such radio technology as the IEEE 802.11 (Wi-Fi), the IEEE 802.16 (WiMAX), the IEEE 802-20, or Evolved UTRA (E-UTRA). UTRA is part of the Universal Mobile Telecommunications System (UMTS). The 3rd Generation Partnership Project (3GPP) Long Term Evolution (LTE) is part of the Evolved UMTS (E-UMTS) which uses the E-UTRA, employing OFDMA for downlink and SC-FDMA for uplink transmission. The LTE-A (Advanced) is an evolved version of the 3GPP LTE system.

Embodiments of the present invention can be supported by standard documents disclosed in at least one of wireless access systems including the IEEE 802, 3GPP, and 3GPP2 specifications. In other words, among the embodiments of the present invention, those steps or parts omitted for the purpose of clearly describing technical principles of the present invention can be supported by the documents above. Also, all of the terms disclosed in this document can be explained with reference to the standard documents.

To clarify the descriptions, this document is based on the 3GPP LTE/LTE-A, but the technical features of the present invention are not limited to the current descriptions.

Terms used in this document are defined as follows.

Universal Mobile Telecommunication System (UMTS): the 3rd generation mobile communication technology based on GSM, developed by the 3GPP Evolved Packet System (EPS): a network system comprising an Evolved Packet Core (EPC), a packet switched core network based on the Internet Protocol (IP) and an access network such as the LTE and UTRAN. The EPS is a network evolved from the UMTS.

NodeB: the base station of the UMTS network. NodeB is installed outside and provides coverage of a macro cell.

eNodeB: the base station of the EPS network. eNodeB is installed outside and provides coverage of a macro cell.

Home NodeB: It is installed indoors as a based station, and the coverage is a micro cell scale.

Home eNodeB: It is installed indoors as a base station of the EPS network, and the coverage is a micro cell scale.

User Equipment (UE): A UE can be called a terminal, Mobile Equipment (ME), or Mobile Station (MS). A UE can be a portable device such as a notebook computer, mobile phone, Personal Digital Assistant (PDA), smart phone, or a multimedia device; or a fixed device such as a Personal Computer (PC) or vehicle-mounted device. The term UE may refer to an MTC terminal in the description related to MTC.

IP Multimedia Subsystem (IMS): a sub-system providing multimedia services based on the IP International Mobile Subscriber Identity (IMSI): a globally unique subscriber identifier assigned in a mobile communication network Machine Type Communication (MTC): communication performed by machines without human intervention. It may be called Machine-to-Machine (M2M) communication.

MTC terminal (MTC UE or MTC device or MRT apparatus): a terminal (e.g., a vending machine, meter, and so on) equipped with a communication function (e.g., communication with an MTC server through PLMN (Preferred List of Mobile Networks)) operating through a mobile communication network and performing the MTC functions.

MTC server: a server on a network managing MTC terminals. It can be installed inside or outside a mobile communication network. It can provide an interface through which an MTC user can access the server. Also, an MTC server can provide MTC-related services to other servers (in the form of Services Capability Server (SCS)) or the MTC server itself can be an MTC Application Server.

(MTC) application: services (to which MTC is applied) (e.g., remote metering, traffic movement tracking, weather observation sensors, and so on)

(MTC) Application Server: a server on a network in which (MTC) applications are performed MTC feature: a function of a network to support MTC applications. For example, MTC monitoring is a feature intended to prepare for loss of a device in an MTC application such as remote metering, and low mobility is a feature intended for an MTC application with respect to an MTC terminal such as a vending machine.

MTC user: an MTC user uses a service provided by an MTC server.

MTC subscriber: an entity having a connection relationship with a network operator and providing services to one or more MTC terminals.

MTC group: an MTC group shares at least one or more MTC features and denotes a group of MTC terminals belonging to MTC subscribers.

Services Capability Server (SCS): an entity being connected to the 3GPP network and used for communicating with an MTC InterWorking Function (MTC-IWF)

on a Home PLMN (HPLMN) and an MTC terminal. The SCS provides the capability for a use by one or more MTC applications.

External identifier: a globally unique identifier used by an external entity (e.g., an SCS or an Application Server) of the 3GPP network to indicate (or identify) an MTC terminal (or a subscriber to which the MTC terminal belongs). An external identifier comprises a domain identifier and a local identifier as described below.

Domain identifier: an identifier used for identifying a domain in the control region of a mobile communication network service provider. A service provider can use a separate domain identifier for each service to provide an access to a different service.

Local identifier: an identifier used for deriving or obtaining an International Mobile Subscriber Identity (IMSI). A local identifier should be unique within an application domain and is managed by a mobile communication network service provider.

Radio Access Network (RAN): a unit including a Node B, a Radio Network Controller (RNC) controlling the Node B, and an eNodeB in the 3GPP network. The RAN is defined at the terminal level and provides a connection to a core network.

Home Location Register (HLR)/Home Subscriber Server (HSS): a database provisioning subscriber information within the 3GPP network. An HSS can perform functions of configuration storage, identity management, user state storage, and so on.

RAN Application Part (RANAP): an interface between the RAN and a node in charge of controlling a core network (in other words, a Mobility Management Entity (MME)/Serving GPRS (General Packet Radio Service) Supporting Node (SGSN)/Mobile Switching Center (MSC)).

Public Land Mobile Network (PLMN): a network formed to provide mobile communication services to individuals. The PLMN can be formed separately for each operator.

Non-Access Stratum (NAS): a functional layer for exchanging signals and traffic messages between a terminal and a core network at the UMTS and EPS protocol stack. The NAS is used primarily for supporting mobility of a terminal and a session management procedure for establishing and maintaining an IP connection between the terminal and a PDN GW.

Service Capability Exposure Function (SCEF): an entity in 3GPP architecture for the service capability exposure that provides a means for safely exposing a service and a capability provided by 3GPP network interface.

MME (Mobility Management Entity): A network node in an EPS network, which performs mobility management and session management functions PDN-GW (Packet Data Network Gateway): A network node in the EPS network, which performs UE IP address allocation, packet screening and filtering, and charging data collection functions.

Serving GW (Serving Gateway): A network node in the EPS network, which performs functions such as mobility anchor, packet routing, idle mode packet buffering, and triggering paging for the ME of MME Policy and Charging Rule Function (PCRF): A node in the EPS network, which performs policy decision to dynamically apply differentiated QoS and billing policies for each service flow Open Mobile Alliance Device Management (OMA DM): A protocol designed to manage mobile devices such as mobile phones, PDAs, and portable computers, which performs such functions as device configuration, firmware upgrade, and error report Operation Administration and Maintenance (OAM): A network management function group which provides network fault indication, performance information, and data and diagnostic functions NAS configuration MO (Management Object): A Management Object (MO) used to configure the UE with the parameters associated with the NAS functionality.

PDN (Packet Data Network): A network in which a server supporting a specific service (e.g., MMS server, WAP server, etc.) is located.

PDN connection: A connection from the UE to the PDN, that is, the association (connection) between the UE represented by the IP address and the PDN represented by the APN.

APN (Access Point Name): A string that refers to or identifies the PDN. It is a name (string) (e.g., internet.mnc012.mcc345.gprs) predefined in the network when the P-GW is accessed to access the requested service or network (PDN).

Home Location Register (HLR)/Home Subscriber Server (HSS): A database (DB) that represents subscriber information in the 3GPP network.

NAS (Non-Access-Stratum): The upper stratum of the control plane between the UE and the MME. It supports mobility management (MM), session management (SM) and IP address maintenance between the UE and the network.

AS (Access-Stratum): It includes the protocol stack between the UE and the radio (or access) network and is responsible for transmitting data and network control signals.

In what follows, the present invention will be described based on the terms defined above.

Overview of System to which the Present Invention can be Applied

FIG. 1 illustrates an Evolved Packet System (EPS) to which the Present invention can be applied.

The network structure of FIG. 1 is a simplified diagram restructured from an Evolved Packet System (EPS) including Evolved Packet Core (EPC).

The EPC is a main component of the System Architecture Evolution (SAE) intended for improving performance of the 3GPP technologies. SAE is a research project for determining a network structure supporting mobility between multiple heterogeneous networks. For example, SAE is intended to provide an optimized packet-based system which supports various IP-based wireless access technologies, provides much more improved data transmission capability, and so on.

More specifically, the EPC is the core network of an IP-based mobile communication system for the 3GPP LTE system and capable of supporting packet-based real-time and non-real time services. In the existing mobile communication systems (namely, in the 2nd or 3rd mobile communication system), functions of the core network have been implemented through two separate sub-domains: a Circuit-Switched (CS) sub-domain for voice and a Packet-Switched (PS) sub-domain for data. However, in the 3GPP LTE system, an evolution from the 3rd mobile communication system, the CS and PS sub-domains have been unified into a single IP domain. In other words, in the 3GPP LTE system, connection between UEs having IP capabilities can be established through an IP-based base station (e.g., eNodeB), EPC, and application domain (e.g., IMS). In other words, the EPC provides the architecture essential for implementing end-to-end IP services.

The EPC comprises various components, where FIG. 1 illustrates part of the EPC components, including a Serving Gateway (SGW or S-GW), Packet Data Network Gateway (PDN GW or PGW or P-GW), Mobility Management Entity (MME), Serving GPRS Supporting Node (SGSN), and enhanced Packet Data Gateway (ePDG).

The SGW operates as a boundary point between the Radio Access Network (RAN) and the core network and maintains a data path between the eNodeB and the PDN GW. Also, in case the UE moves across serving areas by the eNodeB, the SGW acts as an anchor point for local mobility. In other words, packets can be routed through the SGW to ensure mobility within the E-UTRAN (Evolved-UMTS (Universal Mobile Telecommunications System) Terrestrial Radio Access Network defined for the subsequent versions of the 3GPP release 8). Also, the SGW may act as an anchor point for mobility between the E-UTRAN and other 3GPP networks (the RAN defined before the 3GPP release 8, for example, UTRAN or GERAN (GSM (Global System for Mobile Communication)/EDGE (Enhanced Data rates for Global Evolution) Radio Access Network).

The PDN GW corresponds to a termination point of a data interface to a packet data network. The PDN GW can support policy enforcement features, packet filtering, charging support, and so on. Also, the PDN GW can act as an anchor point for mobility management between the 3GPP network and non-3GPP networks (e.g., an unreliable network such as the Interworking Wireless Local Area Network (I-WLAN) or reliable networks such as the Code Division Multiple Access (CDMA) network and Wimax).

In the example of a network structure as shown in FIG. 1, the SGW and the PDN GW are treated as separate gateways; however, the two gateways can be implemented according to single gateway configuration option.

The MME performs signaling for the UE's access to the network, supporting allocation, tracking, paging, roaming, handover of network resources, and so on; and control functions. The MME controls control plane functions related to subscribers and session management. The MME manages a plurality of eNodeBs and performs signaling of the conventional gateway's selection for handover to other 2G/3G networks. Also, the MME performs such functions as security procedures, terminal-to-network session handling, idle terminal location management, and so on.

The SGSN deals with all kinds of packet data including the packet data for mobility management and authentication of the user with respect to other 3GPP networks (e.g., the GPRS network).

The ePDG acts as a security node with respect to an unreliable, non-3GPP network (e.g., I-WLAN, WiFi hotspot, and so on).

As described with respect to FIG. 1, a UE with the IP capability can access the IP service network (e.g., the IMS) that a service provider (namely, an operator) provides, via various components within the EPC based not only on the 3GPP access but also on the non-3GPP access.

Also, FIG. 1 illustrates various reference points (e.g., S1-U, S1-MME, and so on). The 3GPP system defines a reference point as a conceptual link which connects two functions defined in disparate functional entities of the E-UTAN and the EPC. Table 1 below summarizes reference points shown in FIG. 1. In addition to the examples of FIG. 1, various other reference points can be defined according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS core and the 3GPP anchor function of Serving GW. In addition, if direct tunnel is not established, it provides the user plane tunneling. |
| S5 | It provides user plane tunneling and tunnel management between Serving GW and PDN GW. It is used for Serving GW relocation due to UE mobility if the Serving GW needs to connect to a non-collocated PDN GW for the required PDN connectivity. |
| S11 | Reference point for the control plane protocol between MME and SGW |
| SGi | It is the reference point between the PDN GW and the packet data network. Packet data network may be an operator external public or private packet data network or an intra-operator packet data network (e.g., for provision of IMS services). This reference point corresponds to Gi for 3GPP accesses. |

Among the reference points shown in FIG. 1, S2a and S2b corresponds to non-3GPP interfaces. S2a is a reference point which provides reliable, non-3GPP access, related control between PDN GWs, and mobility resources to the user plane. S2b is a reference point which provides related control and mobility resources to the user plane between ePDG and PDN GW.

FIG. 2 illustrates one example of an Evolved Universal Terrestrial Radio Access Network (E-UTRAN) to which the present invention can be applied.

The E-UTRAN system has evolved from an existing UTRAN system and may be the 3GPP LTE/LTE-A system, for example. A communication system is disposed over a wide area to provide various communication services including voice communication through IMS and packet data (e.g., VoIP (Voice over Internet Protocol)).

Referring to FIG. 2, an E-UMTS network comprises an E-UTRAN, EPC, and one or more UEs. The E-UTRAN comprises eNBs providing a UE with a control plane and user plane protocols, where the eNBs are connected to each other through X2 interface.

The X2 user plane interface (X2-U) is defined among the eNBs. The X2-U interface provides non-guaranteed delivery of the user plane PDU (Packet Data Unit or Protocol Data Unit). The X2 control plane interface (X2-CP) is defined between two neighboring eNBs. The X2-CP performs the functions of context delivery between eNBs, control of user plane tunnel between a source eNB and a target eNB, delivery of handover-related messages, uplink load management, and so on.

The eNB is connected to the UE through a radio interface and is connected to the Evolved Packet Core (EPC) through the S1 interface.

The S1 user plane interface (S1-U) is defined between the eNB and the Serving Gateway (S-GW). The S1 control plane interface (S1-MME) is defined between the eNB and the Mobility Management Entity (MME). The S1 interface performs the functions of EPS bearer service management, NAS signaling transport, network sharing, MME load balancing management, and so on. The S1 interface supports many-to-many-relation between the eNB and the MME/S-GW.

An MME is capable of performing various functions such as NAS signaling security, AS (Access Stratum) security control, inter-ON (Core Network) signaling for supporting mobility among 3GPP access networks, IDLE mode UE reachability (including performing and controlling retransmission of a paging message), TAI (Tracking Area Identity) management (for IDLE and active mode UEs), PDN GW and SGW selection, MME selection for handover in which MMEs are changed, SGSN selection for handover to a 2G or 3G 3GPP access network, roaming, authentication, bearer management function including dedicated bearer establishment, and support for transmission of a PWS (Public Warning System) (including Earthquake and Tsunami Warning System (ETWS) and Commercial Mobile Alert System (CMAS)) message.

FIG. 3 illustrates structures of an E-UTRAN and an EPC in a wireless communication system to which the present invention may be applied.

Referring to FIG. 3, an eNB is capable of performing functions such as selection of a gateway (e.g., MME), routing to a gateway during RRC (Radio Resource Control) activation, scheduling and transmission of a BCH (Broadcast Channel), dynamic resource allocation for a UE in uplink and downlink transmission, and mobility control connection in an LTE_ACTIVE state. As described above, a gateway belonging to an EPC is capable of performing functions such as paging origination, LTE_IDLE state management, ciphering of a user plane, SAE (System Architecture Evolution) bearer control, and ciphering of NAS signaling and integrity protection.

FIG. 4 illustrates a radio interface protocol structure between a UE and an E-UTRAN in a wireless communication system to which the present invention can be applied.

FIG. 4(a) illustrates a radio protocol structure for the control plane, and FIG. 4(b) illustrates a radio protocol structure for the user plane.

With reference to FIG. 4, layers of the radio interface protocol between the UE and the E-UTRAN can be divided into a first layer (L1), a second layer (L2), and a third layer (L3) based on the lower three layers of the Open System Interconnection (OSI) model, widely known in the technical field of communication systems. The radio interface protocol between the UE and the E-UTRAN consists of the physical layer, data link layer, and network layer in the horizontal direction, while in the vertical direction, the radio interface protocol consists of the user plane, which is a protocol stack for delivery of data information, and the control plane, which is a protocol stack for delivery of control signals.

The control plane acts as a path through which control messages used for the UE and the network to manage calls are transmitted. The user plane refers to the path through which the data generated in the application layer, for example, voice data, Internet packet data, and so on are transmitted. In what follows, described will be each layer of the control and the user plane of the radio protocol.

The physical layer (PHY), which is the first layer (L1), provides information transfer service to upper layers by using a physical channel. The physical layer is connected to the Medium Access Control (MAC) layer located at the upper level through a transport channel through which data are transmitted between the MAC layer and the physical layer. Transport channels are classified according to how and with which features data are transmitted through the radio interface. And data are transmitted through the physical channel between different physical layers and between the physical layer of a transmitter and the physical layer of a receiver. The physical layer is modulated according to the Orthogonal Frequency Division Multiplexing (OFDM) scheme and employs time and frequency as radio resources.

A few physical control channels are used in the physical layer. The Physical Downlink Control Channel (PDCCH) informs the UE of resource allocation of the Paging Channel (PCH) and the Downlink Shared Channel (DL-SCH); and Hybrid Automatic Repeat reQuest (HARQ) information related to the Uplink Shared Channel (UL-SCH). Also, the PDCCH can carry a UL grant used for informing the UE of resource allocation of uplink transmission. The Physical Control Format Indicator Channel (PCFICH) informs the UE of the number of OFDM symbols used by PDCCHs and is transmitted at each subframe. The Physical HARQ Indicator Channel (PHICH) carries a HARQ ACK (ACKnowledge)/NACK (Non-ACKnowledge) signal in response to uplink transmission. The Physical Uplink Control Channel (PUCCH) carries uplink control information such as HARQ ACK/NACK with respect to downlink transmission, scheduling request, Channel Quality Indicator (CQI), and so on. The Physical Uplink Shared Channel (PUSCH) carries the UL-SCH.

The MAC layer of the second layer (L2) provides a service to the Radio Link Control (RLC) layer, which is an upper layer thereof, through a logical channel. Also, the MAC layer provides a function of mapping between a logical channel and a transport channel; and multiplexing/demultiplexing a MAC Service Data Unit (SDU) belonging to the logical channel to the transport block, which is provided to a physical channel on the transport channel.

The RLC layer of the second layer (L2) supports reliable data transmission. The function of the RLC layer includes concatenation, segmentation, reassembly of the RLC SDU, and so on. To satisfy varying Quality of Service (QoS) requested by a Radio Bearer (RB), the RLC layer provides three operation modes: Transparent Mode (TM), Unacknowledged Mode (UM), and Acknowledge Mode (AM). The AM RLC provides error correction through Automatic Repeat reQuest (ARQ). Meanwhile, in case the MAC layer performs the RLC function, the RLC layer can be incorporated into the MAC layer as a functional block.

The Packet Data Convergence Protocol (PDCP) layer of the second layer (L2) performs the function of delivering, header compression, ciphering of user data in the user plane, and so on. Header compression refers to the function of reducing the size of the Internet Protocol (IP) packet header which is relatively large and includes unnecessary control to efficiently transmit IP packets such as the IPv4 (Internet Protocol version 4) or IPv6 (Internet Protocol version 6)

packets through a radio interface with narrow bandwidth. The function of the PDCP layer in the control plane includes delivering control plane data and ciphering/integrity protection.

The Radio Resource Control (RRC) layer in the lowest part of the third layer (L3) is defined only in the control plane. The RRC layer performs the role of controlling radio resources between the UE and the network. To this purpose, the UE and the network exchange RRC messages through the RRC layer. The RRC layer controls a logical channel, transport channel, and physical channel with respect to configuration, re-configuration, and release of radio bearers. A radio bearer refers to a logical path that the second layer (L2) provides for data transmission between the UE and the network. Configuring a radio bearer indicates that characteristics of a radio protocol layer and channel are defined to provide specific services; and each individual parameter and operating methods thereof are determined. Radio bearers can be divided into Signaling Radio Bearers (SRBs) and Data RBs (DRBs). An SRB is used as a path for transmitting an RRC message in the control plane, while a DRB is used as a path for transmitting user data in the user plane.

The Non-Access Stratum (NAS) layer in the upper of the RRC layer performs the function of session management, mobility management, and so on.

A cell constituting the base station is set to one of 1.25, 2.5, 5, 10, and 20 MHz bandwidth, providing downlink or uplink transmission services to a plurality of UEs. Different cells can be set to different bandwidths.

Downlink transport channels transmitting data from a network to a UE include a Broadcast Channel (BCH) transmitting system information, PCH transmitting paging messages, DL-SCH transmitting user traffic or control messages, and so on. Traffic or a control message of a downlink multi-cast or broadcast service can be transmitted through the DL-SCH or through a separate downlink Multicast Channel (MCH). Meanwhile, uplink transport channels transmitting data from a UE to a network include a Random Access Channel (RACH) transmitting the initial control message and a Uplink Shared Channel (UL-SCH) transmitting user traffic or control messages.

A logical channel lies above a transmission channel and is mapped to the transmission channel. The logical channel may be divided into a control channel for delivering control area information and a traffic channel for delivering user area information. The control channel may include a BCCH (Broadcast Control Channel), PCCH (Paging Control Channel), CCCH (Common Control Channel), DCCH (Dedicated Control Channel), and MCCH (Multicast Control Channel). The traffic channel may include a DTCH (Dedicated Traffic Channel) and MTCH (Multicast Traffic Channel). The PCCH is a downlink channel for delivering paging information and is used when a network does not know the cell to which a UE belongs. The CCCH is used by a UE that does not have an RRC connection to a network. The MCCH is a point-to-multipoint downlink channel used for delivering MBMS (Multimedia Broadcast and Multicast Service) control information from a network to a UE. The DCCH is a point-to-point bi-directional channel used by a UE with an RRC connection delivering dedicated control information between a UE and a network. The DTCH is a point-to-point channel dedicated to one UE for delivering user information that may exist in an uplink and downlink. The MTCH is a point-to-multipoint downlink channel for delivering traffic data from a network to a UE.

In the case of an uplink connection between a logical channel and a transport channel, the DCCH may be mapped to a UL-SCH, and the DTCH may be mapped to a UL-SCH, and the CCCH may be mapped to a UL-SCH. In the case of a downlink connection between a logical channel and a transport channel, the BCCH may be mapped to a BCH or DL-SCH, the PCCH may be mapped to a PCH, the DCCH may be mapped to a DL-SCH, the DTCH may be mapped to a DL-SCH, the MCCH may be mapped to an MCH, and the MTCH may be mapped to the MCH.

FIG. 5 illustrates an S1 interface protocol structure in a wireless communication system to which the present invention can be applied.

FIG. 5($a$) illustrates the control plane protocol stack in the S1 interface, and FIG. 5($b$) illustrates the user plane interface protocol structure in the S1 interface.

With reference to FIG. 5, the S1 control plane interface (S1-MME) is defined between the eNB and the MME. Similar to the user plane, the transport network layer is based on IP transmission. However, to ensure reliable transmission of message signaling, the transport network layer is added to the Stream Control Transmission Protocol (SCTP) layer which sits on top of the IP layer. The application layer signaling protocol is called S1 Application Protocol (S1-AP).

The SCTP layer provides guaranteed delivery of application layer messages.

The transport IP layer employs point-to-point transmission for Protocol Data Unit (PDU) signaling transmission.

For each S1-MME interface instance, single SCTP association uses a pair of stream identifiers for the S-MME common procedure. Only part of stream identifier pairs is used for the S1-MME dedicated procedure. The MME communication context identifier is allocated by the MME for the S1-MME dedicated procedure, and the eNB communication context identifier is allocated by the eNB for the S1-MME dedicated procedure. The MME communication context identifier and the eNB communication context identifier are used for identifying a UE-specific S1-MME signaling transmission bearer. The communication context identifier is delivered within each S1-AP message.

If the S1 signaling transport layer notifies the S1AP layer of disconnection of signaling, the MME changes the state of the UE which has used the corresponding signaling connection to ECM-IDLE state. And the eNB releases RRC connection of the corresponding UE.

The S1 user plane interface (S1-U) is defined between eNB and S-GW. The S1-U interface provides non-guaranteed delivery of the user plane PDU between the eNB and the S-GW. The transport network layer is based on IP transmission, and the GPRS Tunneling Protocol User Plane (GTP-U) layer is used on top of the UDP/IP layer to deliver the user plane PDU between the eNB and the S-GW.

FIG. 6 illustrates a physical channel structure in a wireless communication system to which the present invention may be applied.

Referring to FIG. 6, a physical channel delivers signaling and data by using a radio resource comprising one or more subcarriers in the frequency domain and one or more symbols in the time domain.

One subframe having a length of 1.0 ms comprises a plurality of symbols. A specific symbol(s) of a subframe (e.g., a first symbol of a subframe) may be used for a PDCCH. The PDCCH carries information about dynamically allocated resources (e.g., resource block and MCS (Modulation and Coding Scheme)).

EMM and ECM State

In what follows, EPS Mobility Management (EMM) and EPS Connection Management (ECM) states will be described.

FIG. 7 illustrates an EMM and ECM states in a wireless communication system to which the present invention can be applied.

With reference to FIG. 7, to manage mobility of the UE in the NAS layer defined in the control planes of the UE and the MME, EMM-REGISTERED and EMM-DEREGISTERED states can be defined according to the UE is attached to or detached from a network. The EMM-REGISTERED and the EMM-DEREGISTERED states can be applied to the UE and the MME.

Initially, the UE stays in the EMM-DEREGISTERED state as when the UE is first powered on and performs registering to a network through an initial attach procedure to connect to the network. If the connection procedure is performed successfully, the UE and the MME makes transition to the EMM-REGISTERED state. Also, in case the UE is powered off or the UE fails to establish a radio link (namely, a packet error rate for a radio link exceeds a reference value), the UE is detached from the network and makes a transition to the EMM-DEREGISTERED state.

In addition, to manage signaling connection between the UE and the network, ECM-CONNECTED and ECM-IDLE states can be defined. The ECM-CONNECTED and ECM-IDLE states can also be applied to the UE and the MME. ECM connection consists of RRC connection formed between the UE and the eNB; and S1 signaling connection formed between the eNB and the MME. In other words, establishing/releasing an ECM connection indicates that both of the RRC connection and S1 signaling connection have been established/released.

The RRC state indicates whether the RRC layer of the UE is logically connected to the RRC layer of the eNB. In other words, in case the RRC layer of the UE is connected to the RRC layer of the eNB, the UE stays in the RRC_CONNECTED state. If the RRC layer of the UE is not connected to the RRC layer of the eNB, the UE stays in the RRC_IDLE state.

The network can identify the UE staying in the ECM-CONNECTED state at the level of cell unit and can control the UE in an effective manner.

On the other hand, the network is unable to know the existence of the UE staying in the ECM-IDLE state, and a Core Network (CN) manages the UE on the basis of a tracking area unit which is an area unit larger than the cell. While the UE stays in the ECM-IDLE state, the UE performs Discontinuous Reception (DRX) that the NAS has configured by using the ID allocated uniquely in the tracking area. In other words, the UE can receive a broadcast signal of system information and paging information by monitoring a paging signal at a specific paging occasion for each UE-specific paging DRX cycle.

When the UE is in the ECM-IDLE state, the network does not carry context information of the UE. Therefore, the UE staying in the ECM-IDLE state can perform a mobility-related procedure based on the UE such as cell selection or cell reselection without necessarily following an order of the network. If the location of the UE differs from the location recognized by the network while the UE is in the ECM-IDLE state, the UE can inform the network of the corresponding location of the UE through a Tracking Area Update (TAU) procedure.

Meanwhile, when the UE is in the ECM-CONNECTED state, mobility of the UE is managed by an order of the network. While the UE stays in the ECM-CONNECTED state, the network knows to which cell the UE currently belongs. Therefore, the network can transit and/or receiver data to or from the UE, control mobility of the UE such as handover, and perform cell measurement with respect to neighboring cells.

As described above, the UE has to make a transition to the ECM-CONNECTED state in order to receive a general mobile communication service such as a voice or data communication service. As when the UE is first powered on, the UE in its initial state stays in the ECM-IDLE state as in the EMM state, and if the UE successfully registers to the corresponding network through an initial attach procedure, the UE and the MEE make a transition to the ECM connection state. Also, in case the UE has already registered to the network but radio resources are not allocated as traffic is not activated, the UE stays in the ECM-IDLE state, and if new uplink or downlink traffic is generated for the corresponding UE, the UE and the MME make a transition to the ECM-CONNECTED state through a Service Request procedure.

Random Access Procedure

In what follows, a random access procedure provided by the LTE/LTE-A system will be described.

A UE employs the random access procedure to obtain uplink synchronization with an eNB or to have uplink radio resources. After being powered up, the UE acquires downlink synchronization with an initial cell and receives system information. From the system information, the UE obtains a set of available random access preambles and information about a radio resource used for transmission of a random access preamble. The radio resource used for transmission of a random access preamble may be specified by a combination of at least one or more subframe indices and indices on the frequency domain. The UE transmits a random access preamble selected in a random fashion from the set of random access preambles, and the eNB receiving the random access preamble transmits a TA (Timing Alignment) value for uplink synchronization through a random access response. By using the procedure above, the UE obtains uplink synchronization.

The random access procedure is common to a frequency division duplex (FDD) and time division duplex (TDD) scheme. The random access procedure is independent of a cell size and is also independent of the number of serving cells if a carrier Aggregation (CA) is configured.

First, a UE performs the random access procedure in the following cases.

- The case in which a UE performs initial access in an RRC idle state in the absence of an RRC connection to an eNB
- The case in which a UE performs an RRC connection re-establishment procedure
- The case in which a UE connects to a target cell for the first time while performing a handover procedure
- The case in which a random access procedure is requested by a command from an eNB
- The case in which downlink data are generated while uplink synchronization is not met in the RRC connected state
- The case in which uplink data are generated while uplink synchronization is not met in the RRC connected state or a designated radio resource used for requesting a radio resource is not allocated
- The case in which positioning of a UE is performed while timing advance is needed in the RRC connected state The case in which a recovery process is performed at the time of a radio link failure or handover failure The 3GPP Rel-10 specification takes into account applying a TA (Timing Advance) value applicable to one specific cell (e.g., P cell) commonly to a plurality of cells in a wireless access system. However, a UE may combine a plurality of cells belonging to different frequency bands (namely separated with a large distance in the frequency domain) or a plurality of cells having different propagation characteristics. Also, in the case of a specific cell, if the UE performs communication with the eNB (namely macro eNB) through one cell and performs communication with the SeNB through other cell while a small cell such as an RRH (Remote Radio Header) (namely repeater), femto-cell, or pico-cell or a secondary eNB (SeNB) is disposed within the cell for coverage expansion or removal of a coverage hole, a plurality of cells may have different propagation delays. In this case, when the UE performs uplink transmission so that one TA value is applied commonly to a plurality of cells, synchronization of uplink signals transmitted among the plurality of cells may be seriously influenced. Therefore, it may be preferable to have multiple TA values under the CA mode in which a plurality of cells are aggregated. The 3GPP Rel-11 specification takes into account allocating a TA value separately for each specific cell group to support multiple TA values. This is called a TA group (TAG); a TAG may have one or more cells, and the same TA value may be applied commonly to one or more cells belonging to the TAG. To support the multiple TA values, a MAC TA command control element is composed of a 2-bit TAG Identity (ID) and a 6-bit TA command field.

The UE on which a carrier aggregation is configured performs the random access procedure in case that the random access procedure previously described is required in connection with PCell. In case of TAG (that is, primary TAG (pTAG)) to which PCell belongs, the TA, which is determined based on PCell same as the existing case, or regulated through the random access procedure that accompanies PCell, can be applied to all the cells within the pTAG. Meanwhile, in case of TAG (that is, secondary TAG (sTAG)) that is configured with SCells only, the TA, which is determined based on a specific SCell within sTAG, can be applied to all the cells within the corresponding sTAG, and in this time, the TA may be acquired through the random access procedure by being initiated by the eNB. Particularly, the SCell in the sTAG is set to be a (Random Access Channel) RACH resource, and the eNB requests a RACH access in SCell for determining TA. That is, the eNB initiates the RACH transmission on the SCells by PDCCH order that is transmitted from PCell. The response message for the SCell preamble is transmitted through PCell by using RA-RNTI. The TA that is determined based on SCell that successfully completes the random access can be applied to all the cells in the corresponding sTAG by the UE. Like this, the random access procedure may be performed in SCell as well in order to acquire timing alignment of the sTAG to which the corresponding SCell belongs.

In a process of selecting a random access preamble (RACH preamble), the LTE/LTE-A system supports both of a contention-based random access procedure and a non-contention-based random access procedure. In the former procedure, a UE selects one arbitrary preamble from a specific set, while, in the latter procedure, the UE uses the random access preamble that an eNB has allocated only to the specific UE. It should be noted, however, that the non-contention-based random access procedure may be confined to the handover process described above, a case requested by a command from the eNB, and UE positioning and/or timing advance alignment for sTAG. After the random access procedure is completed, a normal uplink/downlink transmission occurs.

Meanwhile, a relay node (RN) also supports both of the contention-based random access procedure and the non-contention-based random access procedure. When a relay node performs the random access procedure, RN subframe configuration is suspended. That is, this means that the RN subframe configuration is temporarily discarded. Thereafter, the RN subframe structure is resumed at the time when the random access procedure is successfully completed.

FIG. 8 illustrates a contention-based random access procedure in a wireless communication system to which the present invention may be applied.

(1) Msg 1 (Message 1)

First, a UE selects one random access preamble (RACH preamble) randomly from a set of random access preambles indicated by system information or a handover command. The UE then selects a PRACH (Physical RACH) resource capable of transmitting the random access preamble and transmits the random access preamble by using the PRACH resource.

A random access preamble is transmitted in six bits on the RACH transmission channel, where the six bit comprises a 5-bit random identity for identifying a UE which transmits a RACH preamble and 1 bit for representing additional information (e.g., indicating size of Msg 3).

An eNB which has received a random access preamble from a UE decodes the preamble and obtains RA-RNTI. A time-frequency resource of a random access preamble transmitted by the corresponding UE determines the RA-RNTI related to a PRACH to which a random access preamble is transmitted.

(2) Msg 2 (Message 2)

The eNB transmits a random access response to the UE, where the RA-RNTI obtained by using the preamble on Msg 1 addresses the random access response. A random access response may include an RA preamble index/identifier, UL grant indicating a uplink radio resource, Temporary Cell RNTI (TC-RNTI), and Time Alignment Command (TAC). A TAC indicates a time synchronization value that the eNB transmits to the UE to maintain uplink time alignment. The UE updates uplink transmission timing by using the time synchronization value. If the UE updates time synchronization, the UE initiates or restarts a time alignment timer. The UL grant includes uplink resource allocation and TPC (Transmit Power Command) used for transmitting a scheduling message (Msg 3) described later. The TPC is used to determine the transmission power fora scheduled PUSCH.

The UE attempts to receive a random access response within a random access response window indicated by the eNB through system information or a handover command, detects a PDCCH masked with an RA-RNTI corresponding to the PRACH, and receives a PDSCH indicated by the detected PDCCH. The random access response information may be transmitted in the form of a MAC PDU (MAC Packet Data Unit) and the MAC PDU may be transmitted through the PDSCH. It is preferable that the PDCCH should include information of the UE that has to receive the PDSCH, frequency and time information of a radio resource of the PDSCH, and transmission format of the PDSCH. As described above, once the UE succeeds to detect the PDCCH transmitted to itself, it may properly receive a random access response transmitted to the PDSCH according to the information of the PDCCH.

The random access response window refers to a maximum time interval in which the UE transmitting a preamble waits to receive a random access response message. The random access response window has a length of "ra-ResponseWindowSize" starting from a subframe after three subframes in the last subframe transmitting a preamble. In other words, the UE waits to receive a random access response during a random access window secured after three subframes from the subframe completed transmission of the preamble. The UE may obtain the random access window size ("ra-ResponseWindowsize") parameter through system information, and the random access window size is determined to be a value between 2 to 10.

If receiving a random access response having the same random access preamble delimiter/identity as that of the random access preamble transmitted to the eNB, the UE stops monitoring the random access response. Meanwhile, if the UE fails to receive a random access response message until a random access response window is terminated or failing to receive a valid random access response having the same random access preamble identity as that of the random access preamble transmitted to the eNB, the UE may consider the reception of the random access response to have failed and then perform the retransmission of the preamble.

As described above, the reason why a random access preamble identity is needed for a random access response is that one random access response may include random access response information for one or more UEs and thus it is necessary to indicate to which UE the UL grant, TC-RNTI, and TAC is valid.

(3) Msg 3 (Message 3)

Receiving a valid random access response, the UE separately processes the information included in the random access response. In other words, the UE applies the TAC and stores the TC-RNTI. Also, by using the UL grant, the UE transmits the data stored in its buffer or newly generated data to the eNB. If the UE is connected for the first time, an RRC Connection request generated at the RRC layer and transmitted through a CCCH may be included in the Msg 3 and transmitted. And in the case of an RRC Connection Re-establishment procedure, an RRC Connection Re-establishment request generated at the RRC layer and transmitted through the CCCH may be included in the Msg 3 and transmitted. Also, a NAS connection request message may be included in the Msg 3.

The Msg 3 has to include a UE identity. In the case of a contention-based random access procedure, the eNB is unable to determine which UEs perform the random access procedure. Thus, the eNB needs the UE identity for each UE to avoid potential contention.

There are two methods for including UE identities. In the first method, if the UE already has a valid cell identity (C-RNTI) allocated by the corresponding cell before performing the random access procedure, the UE transmits its cell identity though a uplink transmission signal corresponding to the UL grant. On the other hand, if the UE has not received a valid cell identity before performing the random access procedure, the UE transmits its unique identity (e.g., SAE(S)-TMSI or a random number). In most cases, the unique identity is longer than the C-RNTI.

The UE uses UE-specific scrambling for transmission on UL-SCH. If the UE has received a C-RNTI, the UE may perform scrambling by using the C-RNTI. If the UE has not received a C-RNTI yet, the UE is unable to perform C-RNTI based scrambling but uses a TC-RNTI received from a random access response instead. If the UE has received data corresponding to the UL grant, it initiates a contention resolution timer for resolving contention.

(4) Msg 4 (Message 4)

When the C-RNTI of a UE is received from the corresponding UE through the Msg 3, the eNB transmits Msg 4 to the UE by using the receiving C-RNTI. On the other hand, in case the eNB receives the unique identity (namely S-TMSI or a random number) through the Msg 3, the eNB transmit the Msg 4 to the UE by using a TC-RNTI allocated to the corresponding UE from a random access response. For example, the Msg 4 may include an RRC Connection Setup message.

After transmitting data including an identity through a UL grant included in the random access response, the UE waits for a command from the eNB to resolve contention. In other words, two methods are available for a method for receiving the PDCCH, too. As described above, in case the identity in the Msg 3 transmitted in response to the UL grant is the C-RNTI, the UE attempts to receive the PDCCH by using its C-RNTI. If the identity is a unique identity (in other words, S-TMSI or a random number), the UE attempts to receive the PDCCH by using the TC-RNTI included in the random access response. Afterwards, in the former case, if the UE receives the PDCCH though its C-RNTI before the contention resolution timer expires, the UE determines that the random access procedure has been performed normally and terminates the random access procedure. In the latter case, if the UE receives the PDCCH through the TC-RNTI before the contention resolution timer is completed, the UE checks the data transmitted by the PDSCH indicated by the PDCCH. If the data includes a unique identity of the UE, the UE determines that the random access procedure has been performed successfully and terminates the random access procedure. The UE obtains the C-RNTI through the Msg 4, after which the UE and the network transmit and receive a UE dedicated message by using the C-RNTI.

Next, a method for resolving contention during random access will be described.

The reason why contention occurs during random access is that the number of random access preambles is, in principle, finite. In other words, since the eNB is unable to assign random access preambles unique to the respective UEs, a UE selects and transmits one from among common random access preambles. Accordingly, although there are cases where two or more UEs select and transmit the same random access preamble by using the same radio resource (PRACH resource), the eNB considers the random access preamble as the one transmitted from a single UE. Thus, the eNB transmits a random access response to the UE and expects that only one UE receive the random access response. However, as described above, because of the possibility of contention, two or more UEs receive the same random access response, and each receiving UE performs an operation due to the random access response. In other words, a problem occurs where two or more UEs transmit different data to the same radio resource by using one UL grant included in the random access response. Accordingly, transmission of the data may all fail, or the eNB may succeed to receive only the data from a specific UE depending on the positions of transmission power of UEs. In the latter case, since two or more UEs assume that they all have succeeded in transmitting their data, the eNB has to inform those UEs that have failed in the contention about their failure. In other words, contention resolution refers to the operation of informing a UE about whether it has succeeded or failed.

Two methods are used for contention resolution. One of the methods employs a contention resolution timer and the other method employs transmitting an identity of a successful UE to other UEs. The former case is used when a UE already has a unique C-RNTI before performing a random access process. In other words, a UE that already has a C-RNTI transmits data including its C-RNTI to the eNB according to a random access response and operates a contention resolution timer. And if the UE receives a PDCCH indicated by its C-RNTI before the contention resolution timer expires, the UE determines that it has won the contention and finishes random access normally. Meanwhile, if the UE fails to receive a PDCCH indicated by its C-RNTI before the contention resolution timer expires, the UE determines that it has lost the contention and performs the random access process again or inform an upper layer of the failure. The latter contention resolution method, namely the method for transmitting an identity of a successful UE, is used when a UE does not have a unique cell identity before performing the random access process. In other words, in case the UE has no cell identity, the UE transmits data by including an upper identity (S-TMSI or a random number) higher than a cell identity in the data according to the UL grant information included in a random access response and operates a contention resolution timer. If the data including the upper identity of the UE is transmitted to a DL-SCH before the contention resolution timer expires, the UE determines that the random access process has been performed successfully. On the other hand, in case the data including the upper identity of the UE is not transmitted to the DL-SCH before the contention resolution data expires, the UE determines that the random access process has failed.

Meanwhile, different from the contention-based random access process illustrated in FIG. 11, a non-contention-based random access process finishes its procedures only by transmitting the Msg 1 and 2. However, before the UE transmits a random access preamble to the eNB as the Msg 1, the eNB allocates a random access preamble to the UE. The random access procedure is terminated as the UE transmits the allocated random access preamble to the eNB as the Msg 1 and receives a random access response from the eNB.

5G System Architecture to which the Present Invention May be Applied

A 5G system is a technology advanced from the 4th generation LTE mobile communication technology and a new radio access technology (RAT) through the evolution of the existing mobile communication network structure or a clean-state structure and an extended technology of long term evolution (LTE), and it supports extended LTE (eLTE), non-3GPP (e.g., WLAN) access and so on.

A 5G system is defined based on a service, and an interaction between network functions (NFs) within architecture for a 5G system may be expressed by two methods as follows.

Reference point representation: indicates an interaction between NF services within NFs described by a point-to-point reference point (e.g., N11) between two NFs (e.g., access and mobility management function (AMF) and session management function (SMF)).

Service-based representation: network functions (e.g., AMFs) within a control plane (CP) permit other authenticated network functions to access its own service. If this representation is necessary, it also includes a point-to-point reference point.

FIG. 9 is a diagram illustrating 5G system architecture to which the present invention may be applied. This drawing is a more simplified drawing of FIG. 10, and description to be given in FIG. 10 may be identically applied to FIG. 9.

This drawing shows a reference model of potential architecture including a potential function entity and a potential reference point. In particular, the designation of the name of a reference point may be used in an individual solution proposal for better understanding and comparison. Any assumption is not applied to the reference model with respect to actual target architecture. That is, the target architecture may have all of illustrated reference points or function entities or may have an additional/another reference point or function entity.

Some reference points in this drawing may include multiple reference points according to a method of additionally separating a CP function and an UP function.

Referring to FIG. 9, the 5G system architecture may include various elements (i.e., network function (NF)). This drawing illustrates an application function (AF), a data network (DN), a user plane function (UPF), a control plane function (CPF), a (radio) access network ((R)AN), and a user equipment (the UE) corresponding to some of the various elements.

The control plane function and user plane function of a NextGen core are indicated by respective boxes (CP function and UP function). An individual solution proposal may segment or duplicate the CP or UP function. In this case, the name of an additional reference point may add an index to the illustrated reference point (e.g., NG4.1, NG4.2).

In this case, the RAN indicates a radio access network based on a 5G RAT or Evolved E-UTRA connected to a NextGen core network.

In the 3GPP system, a concept link to connect NFs within a 5G system is defined as a reference point. The followings illustrate reference points included in 5G system architecture expressed in this drawing.

NG1: reference point between UE and CPF
NG2: reference point between (R)AN and CPF
NG3: reference point between (R)AN and UPF
NG4: reference point between UPF and CPF
NG5: reference point between CPF and AF
NG6: reference point between UPF and DN FIG. 10 is a diagram illustrating 5G system architecture using a reference point representation.

Referring to FIG. 10, the 5G system architecture may include various elements (i.e., a network function (NF)). This drawing illustrates an authentication server function (AUSF), a (core) access and mobility management function (AMF), a session management function (SMF), a policy control function (PCF), an application function (AF), united data management (UDM), a data network (DN), a user plane function (UPF), a (radio) access network ((R)AN) and a user equipment (UE) corresponding to some of the various elements.

Each of the NFs supports the following functions.
AUSF stores data for the authentication of a UE.
AMF provides a function for access of a UE unit and mobility management and may be basically connected to one AMF per one UE.

Specifically, the AMF supports functions, such as signaling between CN nodes for mobility between 3GPP access networks, the termination of a radio access network (RAN) CP interface (i.e., N2 interface), the termination (N1) of NAS signaling, NAS signaling security (NAS ciphering and integrity protection), AS security control, registration area management, connection management, idle mode UE reachability (including control and execution of paging retransmission), mobility management control (subscription and policy), intra-system mobility and inter-system mobility support, the support of network slicing, SMF selection, lawful interception (for an AMF event and an interface to an LI system), the provision of transfer of a session management (SM) message between a UE and an SMF, a transparent proxy for SM message routing, access authentication, access authorization including a roaming right check, the provision of transfer of an SMS message between a UE and an SMSF (SMS(Short Message Service) function), a security anchor function (SEA) and/or security context management (SCM).

Some or all of the functions of the AMF may be supported within a single instance of one AMF.

DN (Data Network) means an operator service, Internet access or a $3^{rd}$ party service, for example. The DN transmits a downlink protocol data unit (PDU) to an UPF or receives a PDU, transmitted by a UE, from a UPF.

PCF provides a function for receiving information about a packet flow from an application server and determining a policy, such as mobility management and session management. Specifically, the PCF supports functions, such as the support of a unified policy framework for controlling a network behavior, the provision of a policy rule so that a CP function(s) (e.g., AMF or SMF) can execute a policy rule, and the implementation of a front end for accessing related subscription information in order to determine a policy within user data repository (UDR).

SMF provides a session management function and may be managed by a different SMF for each session if a UE has a plurality of sessions.

Specifically, the SMF supports functions, such as session management (e.g., session setup, modification and release including the maintenance of a tunnel between a UPF and an AN node), UE IP address allocation and management (optionally including authentication), the selection and control of the UP function, a traffic steering configuration for routing traffic from the UPF to a proper destination, the termination of an interface toward policy control functions, the execution of the control part of a policy and QoS, lawful interception (for an SM event and an interface to an LI system), the termination of the SM part of an NAS message, downlink data notification, the initiator of AN-specific SM information (transferred to an AN through N2 via the AMF), the determination of an SSC mode of a session, and a roaming function.

Some or all of the functions of the SMF may be supported within a single instance of one SMF.

UDM stores the subscription data of a user, policy data, etc. UDM includes two parts, that is, an application front end (FE) and user data repository (UDR).

The FE includes a UDM FE responsible for the processing of location management, subscription management and credential and a PCF responsible for policy control. The UDR stores data required for functions provided by the UDM-FE and a policy profile required by the PCF. Data stored within the UDR includes user subscription data, including a subscription ID, security credential, access and mobility-related subscription data and session-related subscription data, and policy data. The UDM-FE supports functions, such as access to subscription information stored in the UDR, authentication credential processing, user identification handling, access authentication, registration/mobility management, subscription management, and SMS management.

UPF transfers a downlink PDU, received from a DN, to a UE via an (R)AN and transfers an uplink PDU, received from a UE, to a DN via an (R)AN.

Specifically, the UPF supports functions, such as an anchor point for intra/inter RAT mobility, the external PDU session point of interconnection to a data network, packet routing and forwarding, a user plane part for the execution of packet inspection and a policy rule, lawful interception, a traffic usage report, an uplink classifier for supporting the routing of traffic flow of a data network, a branching point for supporting a multi-home PDU session, QoS handling (e.g., the execution of packet filtering, gating and an uplink/downlink rate) for a user plane, uplink traffic verification (SDF mapping between a service data flow (SDF) and a QoS flow), transport level packet marking within the uplink and downlink, downlink packet buffering, and a downlink data notification triggering function. Some or all of the functions of the UPF may be supported within a single instance of one UPF.

AF interoperates with a 3GPP core network in order to provide services (e.g., support functions, such as an application influence on traffic routing, network capability exposure access, an interaction with a policy framework for policy control).

(R)AN collectively refers to a new radio access network supporting all of evolved E-UTRA (E-UTRA) and new radio (NR) access technologies (e.g., gNB), that is, an advanced version of the 4G radio access technology.

The network node in charge of transmission/reception of wireless signals with the UE is the gNB in 5G system, and plays the same role as the eNB.

The gNB supports functions for radio resource management (i.e., radio bearer control and radio admission control), connection mobility control, the dynamic allocation (i.e., scheduling) of resources to a UE in the uplink/downlink, Internet protocol (IP) header compression, the encryption and integrity protection of a user data stream, the selection of an AMF upon attachment of a UE if routing to the AMF has not been determined based on information provided to the UE, the selection of an AMF upon attachment of a UE, user plane data routing to an UPF(s), control plane information routing to an AMF, connection setup and release, the scheduling and transmission of a paging message (generated from an AMF), the scheduling and transmission of system broadcast information (generated from an AMF or operation and maintenance (O&M)), a measurement and measurement report configuration for mobility and scheduling, transport level packet marking in the uplink, session management, the support of network slicing, QoS flow management and mapping to a data radio bearer, the support of a UE that is an inactive mode, the distribution function of an NAS message, an NAS node selection function, radio access network sharing, dual connectivity, and tight interworking between an NR and an E-UTRA.

UE means a user device. A user apparatus may be called a term, such as a terminal, a mobile equipment (ME) or a mobile station (MS). Furthermore, the user apparatus may be a portable device, such as a notebook, a mobile phone, a personal digital assistant (PDA), a smartphone or a multimedia device, or may be a device that cannot be carried, such as a personal computer (PC) or a vehicle-mounted device.

In the figure, for the clarity of description, an unstructured data storage network function (UDSF), a structured data storage network function (SDSF), a network exposure function (NEF) and an NF repository function (NRF) are not shown, but all of the NFs shown in this drawing may perform mutual operations along with the UDSF, NEF and NRF, if necessary.

NEF provides means for safely exposing services and capabilities provided by 3GPP network functions, for example, for a 3$^{rd}$ party, internal exposure/re-exposure, an application function, and edge computing. The NEF receives information from other network function(s) (based on the exposed capability(s) of other network function(s)). The NEF may store information received as structured data using a standardized interface as a data storage network function. The stored information is re-exposed to other network function(s) and application function(s) by the NEF and may be used for other purposes, such as analysis.

NRF supports a service discovery function. It receives an NF discovery request from an NF instance and provides information of a discovered NF instance to an NF instance. Furthermore, it maintains available NF instances and services supported by the available NF instances.

SDSF is an optional function for supporting a function of storing and retrieving information as structured data by any NEF.

UDSF is an optional function for supporting a function of storing and retrieving information as unstructured data by any NF.

In the 5G system, a node which is responsible for wireless transmission/reception with the UE is a gNB and plays the same role as an eNB in the EPS. When the UE is simultaneously connected to the 3GPP connection and the non-3GPP connection, the UE receives a service through one AMF as illustrated in FIG. 9. In FIG. 9, it is illustrated that a connection is made by the non-3GPP connection and a connection is made by the 3GPP connection are connected to one same UPF, but the connection is not particularly required and may be connected by a plurality of different UPFs.

However, when the UE selects N3IWK (also referred to as non-3GPP interworking function (N3IWF)) in the HPLMN in the roaming scenario and is connected to the non-3GPP connection, the AMF that manages the 3GPP connection may be located in the VPLMN (visited PLMN) and the AMF that manages the non-3GPP connection may be located in the HPLMN.

The non-3GPP access network is connected to the 5G core network via N3IWK/N3IWF. The N3IWK/N3IWF interfaces the 5G core network control plane function and user plane function via the N2 and N3 interfaces, respectively.

A representative example of the non-3GPP connection mentioned in the present specification may be a WLAN connection.

Meanwhile, this drawing illustrates a reference model if a UE accesses one DN using one PDU session, for convenience of description, but the present invention is not limited thereto.

A UE may access two (i.e., local and central) data networks at the same time using multiple PDU sessions. In this case, for different PDU sessions, two SMFs may be selected. In this case, each SMF may have the ability to control both a local UPF and central UPF within a PDU session, which can be independently activated per PDU.

Furthermore, a UE may access two (i.e., local and central) data networks provided within one PDU session at the same time.

In the 3GPP system, a conceptual link that connects NFs within the 5G system is defined as a reference point. The following illustrates reference points included in 5G system architecture represented in this drawing.

N1: a reference point between a UE and an AMF
N2: a reference point between an (R)AN and an AMF
N3: a reference point between an (R)AN and a UPF
N4: a reference point between an SMF and a UPF
N5: a reference point between a PCF and an AF
N6: a reference point between a UPF and a data network
N7: a reference point between an SMF and a PCF
N24(N7r): a reference point between a PCF within a visited network and a PCF within a home network
N8: a reference point between a UDM and an AMF
N9: a reference point between two core UPFs
N10: a reference point between a UDM and an SMF
N11: a reference point between an AMF and an SMF
N12: a reference point between an AMF and an AUSF
N13: a reference point between a UDM and an authentication server function (AUSF)
N14: a reference point between two AMFs
N15: a reference point between a PCF and an AMF in the case of a non-roaming scenario and a reference point between a PCF within a visited network and an AMF in the case of a roaming scenario
N16: a reference point between two SMFs (in the case of a roaming scenario, a reference point between an SMF within a visited network and an SMF within a home network)
N17: a reference point between an AMF and an EIR
N18: a reference point between any NF and an UDSF
N19: a reference point between an NEF and an SDSF FIG. 11 is a diagram illustrating 5G system architecture using a service-based representation.

A service-based interface illustrated in this figure shows a set of services provided/exposed by a specific NF. The service-based interface is used within a control plane. The following illustrates service-based interfaces included in the 5G system architecture represented as in this drawing.

Namf: a service-based interface exhibited by an AMF
Nsmf: a service-based interface exhibited by an SMF
Nnef: a service-based interface exhibited by an NEF
Npcf: a service-based interface exhibited by a PCF
Nudm: a service-based interface exhibited by a UDM
Naf: a service-based interface exhibited by an AF
Nnrf: a service-based interface exhibited by an NRF
Nausf: a service-based interface exhibited by an AUSF NF service is a kind of capability exposed to another NF (i.e., NF service consumer) by an NF (i.e., NF service supplier) through a service-based interface. The NF may expose one or more NF service(s). In order to define NF service, the following criteria are applied:

NF services are derived from an information flow for describing an end-to-end function.

A complete end-to-end message flow is described by the sequence of NF service invocation.

Two operations for NF(s) to provide their services through service-based interfaces are as follows:

i) "Request-response": a control plane NF_B (i.e., NF service supplier) receives a request to provide a specific NF service (including the execution of an operation and/or the provision of information) from another control plane NF_A (i.e., NF service consumer). NF_B sends NF service results based on information provided by NF_A within a request as a response.

In order to satisfy a request, NF_B may alternately consume NF services from other NF(s). In the request-response mechanism, communication is performed in a one-to-one manner between two NFs (i.e., consumer and supplier).

ii) "subscribe-notify"

A control plane NF_A (i.e., NF service consumer) subscribes to an NF service provided by another control plane NF_B (i.e., NF service supplier). A plurality of control plane NF(s) may subscribe to the same control plane NF service. NF_B notifies interested NF(s) that have subscribed to NF services of the results of the NF services. A subscription request from a consumer may include a notification request for notification triggered through periodical update or a specific event (e.g., the change, specific threshold arrival, etc. of requested information). The mechanism also includes a case where NF(s) (e.g., NF_B) implicitly subscribe to specific notification without an explicit subscription request (e.g., due to a successful registration procedure).

FIG. 12 illustrates NG-RAN architecture to which the present invention may be applied.

Referring to FIG. 12, a new generation radio access network (NG-RAN) includes an NR NodeB (gNB)(s) and/or an eNodeB (eNB)(s) for providing the termination of a user plane and control plane protocol toward a UE.

An Xn interface is connected between gNBs and between a gNB(s) and an eNB(s) connected to 5GC (5th Generation Core network). The gNB(s) and the eNB(s) are also connected to 5GC using an NG interface. More specifically, the gNB(s) and eNB(s) are also connected to an AMF using an NG-C interface (i.e., N2 reference point), that is, a control plane interface between an NG-RAN and 5GC and are connected to a UPF using an NG-U interface (i.e., N3 reference point), that is, a user plane interface between an NG-RAN and 5GC.

Radio Protocol Architecture

FIG. 13 is a diagram illustrating a radio protocol stack to which the present invention may be applied. Specifically, FIG. 13(a) illustrates a radio interface user plane protocol stack between a UE and a gNB, and FIG. 13(b) illustrates a radio interface control plane protocol stack between the UE and the gNB.

A control plane means a passage through which control messages are transmitted in order for a UE and a network to manage a call. A user plane means a passage through which data generated in an application layer, for example, voice data or Internet packet data is transmitted.

Referring to FIG. 13(a), the user plane protocol stack may be divided into a first layer (Layer 1) (i.e., a physical layer (PHY) layer) and a second layer (Layer 2).

Referring to FIG. 13(b), the control plane protocol stack may be divided into a first layer (i.e., a PHY layer), a second layer, a third layer (i.e., a radio resource control (RRC) layer) and a non-access stratum (NAS) layer.

The second layer is divided into a medium access control (MAC) sublayer, a radio link control (RLC) sublayer, a packet data convergence protocol (PDC) sublayer, and a service data adaptation protocol (SDAP) sublayer (in the case of a user plane).

Radio bearers are classified into two groups: a data radio bearer (DRB) for user plane data and a signaling radio bearer (SRB) for control plane data Hereinafter, the layers of the control plane and user plane of the radio protocol are described.

1) The PHY layer, that is, the first layer, provides information transfer service to a higher layer using a physical channel. The PHY layer is connected to the MAC sublayer located in a high level through a transport channel. Data is transmitted between the MAC sublayer and the PHY layer through a transport channel. The transport channel is classified depending on how data is transmitted according to which characteristics through a radio interface. Furthermore, data is transmitted between different physical layers, that is, between the PHY layer of a transmission stage and the PHY layer of a reception stage through a physical channel.

2) The MAC sublayer performs mapping between a logical channel and a transport channel; the multiplexing/demultiplexing of an MAC service data unit (SDU) belonging to one logical channel or different logical channels to/from a transport block (TB) transferred to/from the PHY layer through a transport channel; a scheduling information report; error correction through a hybrid automatic repeat request (HARQ); priority handling between UEs using dynamic scheduling; priority handling between the logical channels of one UE using logical channel priority; and padding.

Different types of data transfer service provided by the MAC sublayer. Each logical channel type defines that information of which type is transferred.

Logical channels are classified into two groups: a control channel and a traffic channel.

i) The control channel is used to transfer only control plane information and is as follows.

Broadcast control channel (BCCH): a downlink channel system for broadcasting control information.

Paging control channel (PCCH): a downlink channel transferring paging information and system information change notification.

Common control channel (CCCH): a channel for transmitting control information between a UE and a network. This channel is used for UEs not having an RRC connection with a network.

Dedicated control channel (DCCH): a point-to-point bidirectional channel for transmitting dedicated control information between a UE and a network. It is used by a UE having an RRC connection.

ii) The traffic channel is used to use only user plane information:

Dedicated traffic channel (DTCH): a point-to-point channel for transferring user information and dedicated to a single UE. The DTCH may be present in both the uplink and downlink.

In the downlink, a connection between a logical channel and a transport channel is as follows.

A BCCH may be mapped to a BCH. A BCCH may be mapped to a DL-SCH. A PCCH may be mapped to a PCH. A CCCH may be mapped to a DL-SCH. A DCCH may be mapped to a DL-SCH. A DTCH may be mapped to a DL-SCH.

In the uplink, a connection between a logical channel and a transport channel is as follows. A CCCH may be mapped to an UL-SCH. A DCCH may be mapped to an UL-SCH. A DTCH may be mapped to an UL-SCH.

3) The RLC sublayer supports three transport modes: a transparent mode (TM), an unacknowledged mode (UM) and acknowledged mode (AM).

An RLC configuration may be applied to each logical channel. In the case of an SRB, the TM or AM mode is used. In contrast, in the case of a DRB, the UM or AM mode is used.

The RLC sublayer performs the transfer a higher layer PDU; independent sequence numbering with a PDCP; error correction through an automatic repeat request (ARW); segmentation and re-segmentation; the reassembly of an SDU; RLC SDU discard; and RLC re-establishment.

4) The PDCP sublayer for a user plane performs sequence numbering; header compression and compression-decompression (corresponding to only robust header compression (RoHC)); user data transfer; reordering and duplicate detection (if there is transfer to a layer higher than the PDCP); PDCP PDU routing (in the case of a split bearer); the retransmission of a PDCP SDU; ciphering and deciphering; PDCP SDU discard; PDCP re-establishment and data recovery for RLC AM; and the duplication of a PDCP PDU.

The PDCP sublayer for a control plane additionally performs sequence numbering; ciphering, deciphering and integrity protection; control plane data transfer; duplication detection; the duplication of a PDCP PDU.

When duplication for a radio bearer is configured by RRC, an additional RLC entity and an additional logical channel are added to a radio bearer in order to control a duplicated PDCP PDU(s). In the PDCP, duplication includes transmitting the same PDCP PDU(s) twice. The first one is transferred to the original RLC entity, and the second one is transferred to an additional RLC entity. In this case, the duplication corresponding to the original PDCP PDU is not transmitted to the same transport block. Different two logical channels may belong to the same MAC entity (in the case of a CA) or to different MAC entities (in the case of DC). In the former case, a logical channel mapping restriction is used to guarantee that a duplication corresponding to the original PDCP PDU is not transferred to the same transport block.

5) The SDAP sublayer performs i) mapping between a QoS flow and a data radio bearer and ii) QoS flow ID marking within a downlink and uplink packet.

One protocol entity of an SDAP is configured for each PDU session, but exceptionally in the case of dual connectivity (DC), two SDAP entities may be configured.

6) The RRC sublayer performs the broadcasting of system information related to an access stratum (AS) and a non-access stratum (NAS); paging initiated by 5GC or an NG-RAN; the establishment, maintenance and release (additionally including the modification and release of a carrier aggregation and additionally including the modification and release of dual connectivity between an E-UTRAN and an NR or within an NR) of an RRC connection between a UE and an NG-RAN; a security function including key management; the establishment, configuration, maintenance and release of an SRB(s) and a DRB(s); handover and context transfer; control of UE cell selection, re-release and cell selection/reselection; a mobility function including mobility between RATs; a QoS management function, a UE measurement report and report control; the detection of a radio link failure and recovery from a radio link failure; and the transfer of an NAS message from an NAS to a UE and the transfer of an NAS message from a UE to an NAS.

In 3GPP Release 14, a study for a next-generation mobile communication system after EPC is in progress as the following scope (3GPP SP-150863).

A target is to design system architecture for a next-generation mobile network. New architecture must support a new RAT(s), evolved LTE and non-3GPP access types and minimize access dependency. A proposal for the new architecture may now be based on the evolution of current architecture or may be based on a "clean slate" approach method.

In the study, a migrant scenario into the new architecture needs to be taken into consideration. Expected tasks may include the followings:

Review of an architecture requirement of a high level
Definition of terms used as a common language for architecture discussion
Definition of system architecture of a high level for collecting a necessary function and a function of a high level through a mutual interaction Architecture must be developed in a non-exhaustive list of the following operating efficiency and optimization characteristics.

1. Capability to process a sudden increase of mobile data traffic/the number of devices attributable to the existing and new communication services using an extensible method
2. Independent evolution permission of a core and radio network
3. Support of technologies (e.g., network function virtualization and software defined networking) for reducing a total ownership cost, improving energy efficiency and simplicity, and supporting flexibility for providing a new service Next Generation System (NGS)

For the design of a next-generation mobile network system, that is, a 5G core network, in 3GPP, a service requirement is defined through a study called Services and Markets Technology Enablers (SMARTER). Furthermore, in SA2, Study on Architecture for Next Generation System (FS_NextGen) is in progress based on the service requirement.

The following definitions have been defined in TR 23.799 with respect to the NGS.

evolved E-UTRA: RAT evolved from an E-UTRA radio interface in order to operate in the NextGen system;
Network capability: in general, although it is not used as a separate or standalone "user end service", it is a 3GPP specific characteristic used as an element that may be combined as a remote communication service provided to an "end user" and a provided network (e.g., in general, a location service is not used for an "end user" to simply query the location of another UE. A location service is used (e.g., by a tracking application) as a characteristic or network capability and provided as a "user end service". The network capability may be internally used in a network and/or may be exposed to a (called a "3rd party") external user.);
Network function: a network function is a function adopted by 3GPP or a processing function defined by 3GPP in a network, and defines a functional operation and 3GPP definition interface. The network function is a network element on dedicated hardware and may be implemented as a software instance executed on dedicated hardware or an instanced virtualization function on a suitable platform (e.g., cloud infrastructure);
NextGen: this means a next generation used in this specification;
NextGen core network: a core network connected to a NextGen access network;
NextGen RAN (NG RAN): this indicates a radio access network supporting one or more of the following options:
2) Standalone new radio
4) Standalone new radio is an anchor having evolved E-UTRA extension.
5) evolved E-UTRA
7) evolved E-UTRA is an anchor having a new radio extension
It has a common point of a RAN that interfaces with a next generation core;
NextGen access network (NG AN): this means a NextGen RAN or non-3GPP access network and interfaces with a next generation core;
NextGen System (NG system): this means a NextGen system including a NextGen access network (NG AN) and a NextGen core;
NextGen UE: a UE connected to a NextGen system;

PDU connectivity service: service that provides a PDU exchange between a UE and a data network
PDU session: association between a UE and a data network that provides a PDU connectivity service. The type of association includes an IP Type, an Ethernet Type and a non-IP Type;
PDU session of IP Type: association between a UE and an IP data network;
Service continuity: user experience not having interrupted service, including a case where an IP address and/or an anchor point is changed;
Session continuity: continuity of a PDU session. With respect to an IP Type PDU session, "session continuity" means that an IP address is preserved during the life cycle of a PDU session.

A requirement in next generation mobile networks (NGMN) Alliance in relation to network slicing has defined.

FIG. 14 is a diagram illustrating a network slicing concept according to an embodiment of the present invention.

Referring to FIG. 14, the network slicing may include three layers of 1) a service instance layer, 2) a network slice instance layer, and 3) a resource layer.

The service instance layer indicate4s a service (end-user service or business service) to be supported. Each service may be indicated as a service instance. In general, the service may be provided by a network operator or 3rd party. Accordingly, the service instance may indicate an operator service or a 3rd party providing service.

A network operator may generate a network slice instance using a network slice Blueprint. The network slice instance provides a network characteristic necessary for a service instance. The network slice instance may be shared between multiple service instances provided by the network operator.

A network slice instance may include one or more sub-network instances that cannot be shared by another network slice instance or may not include them. Likewise, the sub-network Blueprint may be used to generate a sub-network instance that configures a network function set executed in a physical/logical resource.

Hereinafter, terms related to network slicing are defined.
Service instance: instance of an end user service or business service realized within a network slice or by a network slice.
Network slice instance: this is a network function set and resources for executing such network functions and forms a fully instanced logical network to satisfy a specific network characteristic necessary for a service instance.
Network slice instance may be isolated from a different network slice instance fully or partially, physically/logically,
Resource includes a physical and logical resource,
Network slice instance may include a sub-network instance that may be shared by multiple network slice instances in special cases. A network slice instance is defined by the network slice Blueprint,
An instance-specific policy and configuration are necessary when a network slice instance is generated,
Examples of network characteristics include ultra-low-latency and ultra-reliability.
The network slice Blueprint: Full description of a structure, construction and plan/workflow for a method of instantiating and controlling a network slice instance during the life cycle. The network slice Blueprint enables the instantiation of a network slice that provides specific network characteristics (e.g., ultra-low-latency, ultra-reliability, and value-added service for a company). The network slice Blueprint indicates a necessary physical and logical resource and/or a sub-network Blueprint.
Sub-network instance: a sub-network instance includes a series of network functions and a resource for such network functions,
Sub-network instance is defined by the sub-network Blueprint,
Sub-network instance does not need to form a perfect logical network,
Sub-network instance cannot be shared by two or more network slices,
Resource includes physical and logical resources.
Sub-network Blueprint: description of the structure (and included elements) of a sub-network instance and the plan/workflow of a method of instantiating it, and the sub-network Blueprint indicates physical and logical resources and may indicate a different sub-network Blueprint.
Physical resource: it includes radio access and is a physical resource for computation, storage or transmission: a network function is not considered as a resource.
Logical resource: Partition of a physical resource or grouping of multiple physical resources dedicated for a network function or shared between multiple network function sets.
Network function (NF): a network function means the processing of a function in a network,
The NF includes a switching function in addition to a telecom node function, but is not limited thereto (e.g., Ethernet switching function, IP routing function),
VNF is a virtualization version of the NF (for detailed contents of the VNF, reference is made to ETSI NFV).

The following potential requirements have been defined through SMARTER task in SA WG1 based on them.

Network Slicing

A 5G system has introduced a network slicing technology which provides network resources and network functions to an independent slice based on each service.

An operator may provide a customized network through network slicing. For example, services may be provided if there is a difference between the requirement of functions (e.g., priority, billing, policy control, security and mobility), if there is a difference between performance requirements (e.g., delay time, mobility, availability, reliability and data speed) or with respect to only a specific user (e.g., a multiple projections system (MPS) user, a public safety user, company customers, a roamer or mobile virtual network operator (MVNO) hosting).

A network slice may provide a function of a full network including a radio access network function and core network function (e.g., from a potentially different vendor). One network may support one or more network slices.

Hereinafter, the requirement of network slicing in a 5G system is described.

A 5G system needs to allow an operator to generate, modify and delete a network slice.

A 5G system needs to allow an operator to define and update a series of services and functions supported in a network slice.

A 5G system needs to allow an operator to configure information that associates a UE with a network slice.

A 5G system needs to allow an operator to configure information that associates services with a network slice.

A 5G system needs to allow an operator to assign a UE to a network slice, to move a UE from one network slice to the other network slice, and to remove a UE from a network slice based on subscription provided by a network slice, a UE function, and the policy and service of an operator.

A 5G system needs to support a mechanism in which a VPLMN has a UE and a necessary service and assigns it to a network slice allowed by an HPLMN or a basic network slice.

A 5G system needs to allow a UE to be assigned to two or more network slices of one operator at the same time and to access services of an assigned network slice.

Traffic and service of one network slice do not affect traffic and service of the other network slice within the same network.

The generation, modification and deletion of a network slice do not affect traffic and service within another network slice of the same network or have a minimal influence on the traffic and service within another network slice of the same network.

A 5G system needs to support the adaptation of a capacity (i.e., capacity elasticity of a network slice).

A 5G system enables a network operator to define a minimum available capacity for a network slice. The capacity elasticity of another network slice on the same network does not affect the availability of a minimum capacity for a corresponding network slice.

A 5G system may enable a network operator to define a maximum capacity for a network slice.

A 5G system needs to allow a network operator to define priority between different network slices when multiple network slices content contend each other for the resource of the same network.

A 5G system supports a method for an operator to add and remove a network function to and from a network so that the network function can be used in a network slice.

A 5G system needs to support a method for an operator to differentiate a policy, function and performance provided in a different network slice.

A 5G system needs to support the provision of connectivity to a home and a roaming user present in the same network slice.

In a shared 5G network configuration, each operator needs to be able to apply all of requirements to an assigned network resource.

A network slice is a full logical network including a specific network function, a network function set necessary to provide a network characteristic, and a corresponding resource. The network slice includes both a 5G-AN and a 5G CN. A network slice instance (NSI) means the instantiation of a network slice, that is, a deployed network function set that delivers an intended network slice service according to a network slice template.

As network slicing is introduced, the isolation, independent management, etc. of a network function and network resources can be provided for each slice. Accordingly, services that are independent for each service or user and that are more flexible can be provided by selecting and combining network functions of the 5G system depending on a service or user.

A network slice refers to a network that logically integrates an access network and a core network.

The network slice may include one or more of the followings:
Core network control plane and user plane function
NG-RAN
Non-3GPP interworking function (N31WF) toward a non-3GPP access network A function supported for each network slice and network function optimization may be different. A plurality of network slice instances (NSIs) may provide the same function to different groups of UEs.

One UE may be connected to one or more network slice instances at the same time via a 5G-AN. One UE may be served at the same time by a maximum of 8 network slices. An AMF instance that serves a UE may belong to each network slice instance that serves the UE. That is, the AMF instance may be common to a network slice instance that serves the UE. The CN part of a network slice instance(s) that serves a UE is selected by a CN.

AMF discovery and selection of a set of slices for a UE are triggered by the AMF that is first touched in a registration procedure. This may lead to a modification of the AMF. SMF discovery and selection are initiated by the AMF when an SM message for setting up a PDU session is received from a UE. The NRF is used to help a discovery and selection task.

One PDU session belongs to only a specific one network slice instance for each PLMN. Different network slice instances do not share one PDU session.

One PDU session belongs to a specific one network slice instance for each PLMN. Different slices may have slice-specific PDU sessions using the same Data Network Name (DNN), but different network slice instances do not share one PDU session.

Single network slice selection assistance information (S-NSSAI) identifies a network slice. Each S-NSSAI is assistant information used for a network to select a specific network slice instance. The NSSAI is a set of S-NSSAI(s). The S-NSSAI includes the followings:
Slice/service type (SST): the SST indicates the operation of a network slice expected form a viewpoint of a function and service.
Slice differentiator (SD): the SD is optional information that supplements an SST(s) for selecting a network slice instance from a plurality of potential network slice instances all of which comply with an indicated SST.

S-NSSAI may have a standard value or a PLMN-specific value. The S-NSSAI having a PLMN-specific value is associated with the PLMN ID of a PLMN that assigns the PLMN-specific value. The S-NSSAI should not be used by a UE in an access stratum procedure other than a PLMN related to the S-NSSAI.

NSSAI is a collection of S-NSSAIs. In the NSSAI, S-NSSAI transmitted as a signaling message between a UE and a network is up to a maximum of 8. Each S-NSSAI assists a network when a specific network slice instance is selected.

The same network slice instance may be selected using a different S-NSSAI.

According to the operation or deployment necessity of an operator, multiple network slice instances of a network slice may be deployed in the same or different registration areas with respect to the same S-NSSAI. A UE may be served by only one instance in a specific time of corresponding deployed multiple network slice instances whenever the UE is associated with S-NSSAI.

The CN portion of a network slice instance(s) that serves a UE is selected by a CN.

An (R)AN may use a requested NSSAI in access stratum signaling in order to process a UE control plane connection before 5GC notifies the (R)AN of an allowed NSSAI. The requested NSSAI is not used by the RAN for routing when a UE provides a temporary user ID.

When a UE is successfully registered, a CN notifies an (R)AN by providing all of allowed NSSAIs with respect to a control plane aspect.

When a PDU session for a specific slice instance is established, a CN may provide an (R)AN with an S-NSSAI corresponding to a slice instance to which a PDU session belongs so that the RAN can perform an access-specific function.

Standardized SST values provide a method of establishing global interoperability for slicing so that a PLMN can support roaming use examples more efficiently with respect to the most commonly used slice/service types.

The standardized SST values are shown in Table 2.

TABLE 2

| Slice/service Type | SST value | Characteristics |
|---|---|---|
| Enhanced mobile broadband (eMBB) | 1 | It is a slice suitable for 5G eMBB processing, and is useful for common consumer space mobile wide band applications including video streaming of high quality and fast high-capacity file transport, but is not limited thereto.<br>This SST has an object of high traffic density described in Table 7.1-1 "performance requirement for high data transmission rate and traffic density scenario" of high data speed and TS 22.261 [x]. |
| Ultra-reliable low latency communications (URLLC) | 2 | It supports URLLC for an application including industrial automation, (remote) control system.<br>This SST has an object of supporting the requirement of Table 7.2.2-1 "performance requirement for services of low-latency and high reliability" of TS 22.261 associated with high reliability and low latency scenario. |
| Massive IoT (MIoT) | 3 | It allows the large quantity and high density support of Internet of Things (IoT) device efficiently and economically. |

The support of all the standardized SST values is not required for a PLMN.

Subscription information includes the S-NSSAI of a network slice to which a UE has subscribed. One or more S-NSSAIs may be marked as a default S-NSSAI. A maximum of up to 8 S-NSSAIs may be marked as default S-NSSAIs. However, a UE may subscribe to 8 or more S-NSSAIs. If an S-NSSAI is marked by default, a network expects that it will serve a UE using a related network slice although the UE does not transmit a specific S-NSSAI to the network in a registration request.

UE subscription data may include a default DNN value for a given S-NSSAI.

An NSSAI provided by a UE in a registration request is verified with respect to the subscription data of a user.

1) Upon Initial Access, Network Slice Selection

A Configured NSSAI may be configured in a UE by a home PLMN (HPLMN) for each PLMN. The Configured NSSAI becomes PLMN-specific, and the HPLMN indicates a PLMN(s) to which each Configured NSSAI has been applied.

Upon initial connection of a UE, an RAN selects an initial network slice that will transfer a message using an NSSAI. To this end, in a registration procedure, a UE provides a requested NSSAI to a network. In this case, when the UE provides the requested NSSAI to the network, a UE within a specific PLMN uses only S-NSSAIs belonging to the Configured NSSAI of the corresponding PLMN.

If a UE does not provide an NSSAI to an RAN and an RAN does not select a proper network slice based on the provided NSSAI, the RAN may select a default network slice.

Subscription data includes the S-NSSAI(s) of a network slice(s) to which a UE has subscribed. One or more S-NSSAI(s) may be marked as a default S-NSSAI. When an S-NSSAI is marked by default, although a UE does not transmit any S-NSSAI to a network within a Registration Request, the network may serve the UE through a related network slice. The UE subscription data may include a default DNN for given S-NSSAI. An NSSAI provided by a UE in a registration request is verified with respect to the subscription data of a user.

When a UE is successfully registered, a CN notifies an (R)AN of all of Allowed NSSAIs (including one or more S-NSSAIs) by providing the NSSAIs. Furthermore, when the registration procedure of the UE is successfully completed, the UE may obtain an Allowed NSSAI for a PLMN from an AMF.

The Allowed NSSAI has precedence over the Configured NSSAI for the PLMN. Thereafter, the UE uses only an S-NSSAI(s) within the Allowed NSSAI corresponding to a network slice for a network slice selection-related procedure within the serving PLMN.

In each PLMN, a UE stores a Configured NSSAI and an Allowed NSSAI (if present). When the UE receives an Allowed NSSAI for a PLMN, it overrides the previously stored Allowed NSSAI for the PLMN.

2) Slice Change

A network may change an already selected network slice instance depending on a local policy and the mobility, subscription information change, etc. of a UE. That is, a set of network slices of a UE may be changed at any time while the UE is registered with a network. Furthermore, a change of a set of network slices of a UE may be initiated by a network or under specific conditions.

A network may change a set of allowed network slice(s) with which a UE has been registered based on a local policy, a subscription information change and/or the mobility of the UE. A network may perform such a change during a registration procedure or may notify a UE of a change of a supported network slice(s) using a procedure capable of triggering a registration procedure.

Upon changing the network slice, the network may provide the UE with a new Allowed NSSAI and a tracking area list. The UE includes the new NSSAI in signaling according to a mobility management procedure and transmits the signaling, thereby causing the reselection of a slice instance.

An AMF supporting the slice instance may also be changed in response to a change of the slice instance.

When a UE enters an area in which a network slice is no longer available, a core network releases a PDU session for an S-NSSAI corresponding to a network slice that is no longer available through a PDU session release procedure.

When the PDU session corresponding to the slice that is no longer available is released, the UE determines whether the existing traffic can be routed through a PDU session belonging to another slice using a UE policy.

For a change of a set of used S-NSSAI(s), a UE initiates a registration procedure.

3) SMF Selection

A PCF provides a UE with a network slice selection policy (NSSP). The NSSP associates the UE with an S-NSSAI and is used by the UE in order to determine a PDU session to which traffic will be routed.

A network slice selection policy is provided for each application of a UE. This includes a rule by which an S-NSSAI can be mapped for each UE application. The AMF selects an SMF for PDU session management using subscriber information and a local operator policy along with an SM-NSSAI transferred by a UE and DNN information.

When a PDU session for a specific slice instance is established, a CN provides an (R)AN with an S-NSSAI corresponding to the slice instance to which the PDU session belongs so that an RAN can access a specific function of a slice instance.

4) UE NSSAI Configuration and NSSAI Storage Area (Aspect)

A UE may be configured by an HPLMN with an NSSAI configured for each PLMN. The configured NSSAI may be PLMN-specific. The HPLMN includes whether the configured NSSAI is applied to all PLMNs and indicates that each configured NSSAI is applied to which PLMN(s) (i.e., the configured NSSAI may deliver the same information regardless of a PLMN accessed by the UE (e.g., this may be possible for NSSAIs including only standardized S-NSSAIs). Upon registration, when a requested NSSAI is provided to a network, a UE of a given PLMN has to use only an S-NSSAI belonging to a configured NSSAI if the corresponding PLMN is present. When the registration procedure of the UE is successfully completed, the UE may obtain an allowed NSSAI about a PLMN that may include one or more S-NSSAIs from the AMF. Such S-NSSAIs are valid for a current registration area provided by a serving AMF with which the UE has been registered and may be used by the UE at the same time (up to a maximum number of simultaneous network slices or PDU session).

An allowed NSSAI has priority over a configured NSSAI with respect to a PLMN. A UE needs to use only the S-NSSAI of an allowed NSSAI corresponding to a network slice with respect to a subsequent network slice selection-related procedure of a serving PLMN.

A UE needs to store a configured NSSAI and (if possible) an allowed NSSAI with respect to each PLMN. When a UE receives an allowed NSSAI with respect to a PLMN, the UE needs to store the allowed NSSAI for the PLMN and to overwrite an allowed NSSAI previously stored with respect to the PLMN.

The configuration of a user plane connection with a data network through a network slice instance includes two steps:
Perform an RM procedure for selecting the AMF to support a necessary network slice.
Establish one or more PDU sessions in a required data network through a network slice instance(s).

5) Outline of Detailed Operation

When a UE registers a PLMN, if the PLMN is stored in the UE, the UE needs to provide NSSAIs configured in the networks of the RRC and NAS layers, an allowed NSSAI or a subset thereof.

Whether the NSSAIs of RRC and NAS are precisely the same may be determined. The NSSAI is used to select the AMF, whereas an S-NSSAI is used to assist network slice instance selection.

A UE needs to store a configured and/or allowed NSSAI for each PLMN.

Configured NSSAI is configured in a UE by an HPLMN so that it is used in the PLMN when a PLMN-specific allowed NSSAI is not stored in the UE.

Allowed NSSAI is an NSSAI provided to a UE by a PLMN in a registration procedure. A UE needs to use an allowed NSSAI in a corresponding PLMN until next registration from the corresponding PLMN. A Registration Accept message may include the allowed NSSAI. The allowed NSSAI may be updated by a subsequent registration procedure.

When a UE receives an NSSAI configured with respect to a selected PLMN, the UE needs to include the NSSAI in RRC connection establishment and NAS. An RAN routes initial access to the AMF using the received NSSAI.

If a UE has not yet received any accepted NSSAI with respect to a selected PLMN, when the UE receives an NSSAI configured with respect to the selected PLMN, the UE may provide the configured NSSAI or sub-set to RRC connection establishment and NAS. An RAN uses an NSSAI in order to route initial access to the AMF.

If a UE does not provide any NSSAI (allowed or configured) with respect to a selected PLMN in RRC connection establishment and NAS, an RAN transmits NAS signaling to a default AMF.

When registration is successfully performed, a UE is provided with a globally unique temporary UE identity (GUTI) by a serving AMF. The UE includes a local unique temporary ID in RRC connection establishment during subsequent initial access so that an RAN whose Temp ID is valid can route an NAS message to a suitable AMF. Furthermore, a serving PLMN may return the recently allowed NSSAI of slices allowed by the serving PLMN for the UE. The allowed NSSAI includes the S-NSSAI values of slices allowed by the serving PLMN of the UE.

When an NSSAI and a full local unique temporary ID are received in RRC, if an RAN can reach the AMF corresponding to a locally unique temporary ID, the RAN forwards a request to the corresponding AMF. If not, the RAN selects a suitable AMF based on an NSSAI provided by a UE and transmits the request to the selected AMF. If the RAN cannot select the AMF based on a provided NSSAI, the request is transmitted to a default AMF.

A network operator may provide a UE with a network slice selection policy (NSSP). The NSSP includes one or more NSSP rules, each one for associating one application with a specific S-NSSAI. A default rule for matching all of applications to an S-NSSAI may also be included in the NSSP. When a UE application associated with a specific S-NSSAI requests data transmission:

If the UE does not have one or more PDU sessions established based on a specific S-NSSAI, the UE routes the user data of this application in one of the corresponding PDU sessions unless other conditions of the UE do not forbid the use of the PDU sessions. If the application provides a DNN, the UE determines a PDU session to be used by taking into consideration the DNN.

If a UE does not have a PDU session established based on such a specific S-NSSAI, the UE requests a new PDU session along with the S-NSSAI and a DNN to be provided by an application. In order to select a suitable resource for supporting network slicing in an RAN, the RAN needs to recognize a network slice used by the UE.

A network may modify a network slice set used by a UE by providing the UE with an allowed NSSAI change notification indicative of a new value of the NSSAI based on a local policy, a subscription change and/or UE mobility. This triggers a UE-initiation re-registration procedure including the value of a new NSSAI provided by the network in RRC and NAS signaling.

A modification (whether it has been initiated by a UE or a network) of a slice set used by a UE may cause the AMF change according to an operator policy.

When a network slice set accessible to a UE is modified, if such a slice is no longer used (if some slices are potentially maintained), a set of the original network slices and an ongoing PDU session are terminated.

During an initial registration procedure, when a network determines that a UE must be served by a different AMF, the AMF that first received an initial registration request may redirect the initial registration request to the different AMF through an RAN or through direct signaling between an initial AMF and a target AMF. A redirection message transmitted by the AMF through the RAN needs to include information about a new AMF that will serve the UE.

With respect to an already registered UE, a system needs to support redirection initiated from a serving AMF to a target AMF by the network of the UE.

An operator policy determines whether redirection between the AMFs is permitted.

If a network determines to redirect the UE due to an NSSAI change, the network transmits an updated/new NSSAI to the UE using an RM procedure, and transmits an instruction indicating that the UE starts a registration update procedure based on the updated/new NSSAI. The UE initiates the registration update procedure based on the updated/new NSSAI.

An AMF selects an SMF in a network slice instance based on an S-NSSAI, a DNN and other information (e.g., UE subscription and a local operator policy). The selected SMF establishes a PDU session based on an S-NSSAI and a DNN.

In a roaming scenario, the network slice-specific network function of a VPLMN and HPLMN is selected as follows based on an S-NSSAI provided by a UE during PDU connection establishment:

If a standardized S-NSSAI is used, the selection of a slice-specific NF instance is performed by each PLMN based on a provided S-NSSAI.

Otherwise, the VPLMN maps the S-NSSAI of the HPLMN to the S-NSSAI of the VPLMN based on a roaming agreement (including mapping to a default S-NSSAI of the VPLMN). The selection of a slice-specific NF instance in the VPLMN is performed based on the S-NSSAI of the VPLMN, and the slice-specific NF instance selection of the HPLMN is based on the S-NSSAI of the HPLMN.

FIG. 15 illustrates a protocol stack between a UE-core network of a 5G/NR system to which the present invention may be applied.

N1 may perform a role similar to that of the NAS protocol of EPS, and N2 may perform a role similar to that of the S1-AP of EPS. 5G RRC and 5G AS correspond to conventional LTE RRC and LTE AS or NR RRC and NR AS of an NR for which standard is newly in progress, respectively. It is expected that both RAT RRCs will be based on current LTE RRC.

UE Having Configured or Allowed NSSAI with Respect to PLMN

When a UE is registered with a PLMN, if the UE has a configured NSSAI or allowed NSSAI with respect to the PLMN, the UE needs to provide a requested NSSAI including an S-NSSAI(s) (e.g., about the UE) to the network of an RRC and NAS layer. In this case, if a temporary user ID has been assigned to the UE, the S-NSSAI(s) may correspond to a slice(s) to be registered by the UE in addition to a temporary user ID.

A requested NSSAI may be any one of:
a configured NSSAI or a subset thereof, such as that described below, if the UE does not have an allowed NSSAI with respect to a current PLMN;
an allowed NSSAI or a subset thereof, such as that described below, if the UE has an allowed NSSAI with respect to a current PLMN; and
an allowed NSSAI or a subset thereof, such as that described below, and one or more S-NSSAIs from a configured NSSAI in which a corresponding S-NSSAI is not present within an allowed NSSAI and which has not been permanently rejected by a network before with respect to a current tracking area.

If an S-NSSAI has been previously rejected permanently by a network with respect to a current tracking area or has not been previously added by a UE in a requested NSSAI, a subset of a configured NSSAI includes a combination of S-NSSAIs including one or more S-NSSAIs(s) of a configured NSSAI applicable to a PLMN.

A subset of an allowed NSSAI includes a combination of S-NSSAIs including one or more S-NSSAIs in an NSSAI finally allowed with respect to the PLMN.

A UE may provide an S-NSSAI from a configured NSSAI previously provided to a serving PLMN in a current registration area in a requested NSSAI.

The UE needs to include the requested NSSAI in RRC connection establishment and NAS message. An RAN needs to route an NAS signal between the UE and the AMF selected using the requested NSSAI obtained during the RRC connection establishment. If the RAN cannot select the AMF based on the requested NSSAI, it may route NAS signaling to the AMF in a set of default AMFs.

If a UE does not provide a requested NSSAI, a network operation is the same as contents to be described in relation to 'UE not having an NSSAI about a PLMN'.

When a UE is successfully registered, the UE is provided with a temporary ID by a serving AMF. The UE needs to include the temporary ID in all of RRC connection establishments during subsequent initial access so that an RAN can route NAS signaling between the UE and a suitable AMF.

A serving PLMN may also return a new allowed NSSAI to identify a network slice allowed by the serving PLMN for a UE in a current registration area provided by the serving AMF by taking into consideration subscription information, the RAN capability within the registration area and other locally available information. The UE may store the new allowed NSSAI and overwrite an NSSAI previously allowed with respect to the PLMN with the new allowed NSSAI.

A network may individually reject an S-NSSAI provided by a UE in a requested NSSAI having a rejected cause. The network may indicate whether the rejection is permanent (e.g., an S-NSSAI is not supported by a PLMN in at least current registration area) or temporary (e.g., a network slice corresponding to an S-NSSAI is not temporarily available).

When a requested NSSAI and a temporary ID are received in RRC, if an RAN can reach the AMF corresponding to a temporary ID, an RAN forwards a request to the AMF. If not, the RAN selects a suitable AMF based on a requested NSSAI provided by a UE and transmits the request to the selected AMF. If the RAN cannot select the AMF based on the requested NSSAI, the request is transmitted to a default AMF.

UE not Having NSSAI for PLMN

When a UE is registered with a PLMN, if the UE does not have a configured NSSAI or allowed NSSAI with respect to the PLMN, an RAN needs to route all of NAS signaling from/to a UE to to/from a default AMF. If the UE does not have a configured NSSAI or allowed NSSAI with respect to the corresponding PLMN, any NSSAI should not be indicated in RRC connection establishment or an initial NAS message. When the registration is successfully performed, the UE may be provided with an allowed NSSAI to identify a slice allowed by a serving PLMN for the UE, that is, part of a subscribed and default S-NSSAI(s) in addition to a temporary ID by the AMF within the PLMN. The UE needs to include the temporary ID in all of RRC connection establishments during subsequent initial access so that the RAN can route NAS signaling between the UE and a suitable AMF.

Modification of Network Slice Set for UE

A set of network slices for a UE may be modified anytime while the UE is registered with a network and may be initiated by the network or the UE under a specific condition as will be described later. In this specification, it is assumed that a registration area assigned to a UE by the AMF should have homogeneous support for network slices.

A network based on a local policy, a subscription change and/or UE mobility may modify a set of allowed network slice(s) with within a UE has been registered. The network may perform such a modification during a registration procedure or may trigger notification for a UE regarding a modification of a supported network slice using an RM procedure (capable of triggering a registration procedure). The network provides the UE with a new allowed NSSAI and a tracking area list.

If a UE enters an area in which a network slice is no longer available, a CN may release a PDU session based on an S-NSSAI corresponding to the slice that is no longer available through a network-triggered PDU session release procedure.

When the PDU session corresponding to the slice that is no longer available is released, the UE determines whether the existing traffic can be routed through a PDU session belonging to a different slice using a UE policy.

In order to change a used S-NSSAI set, the UE has to start a registration procedure.

A change (whether it is initiated by a UE or a network) of an S-NSSAI set with which the UE has been registered may cause the AMF change depending on an operator policy.

AMF Relocation Attributable to Network Slice Support

During a registration procedure for a PLMN, if a network determines that service needs to be provided by a different AMF based on a network slice aspect, first, the AMF that has received a registration request needs to retransmit the registration request to the different AMF through direct signaling between an RAN or an initial AMF and a target AMF. A redirection message transmitted by the AMF through the RAN needs to include information for selecting a new AMF that will serve a UE.

In the case of an already registered UE, a system needs to support redirection initiated from a serving AMF to a target AMF by the network of the UE due to a network slice consideration. An operator policy may determine whether redirection is allowed between the AMFs.

PDU Session Connection Establishment for Necessary Network Slice Instance(s)

The establishment of a PDU session with a DN in a network slice allows data transmission in a network slice. A data network is associated with an S-NSSAI and a DNN.

A network operator may provide a UE with a network slice selection policy (NSSP). The NSSP includes one or more NSSP rules. Each NSSP rule associates a specific S-NSSAI and an application, and may also include a default rule that matches all of applications with an S-NSSAI. When a UE application related to a specific S-NSSAI requests data transmission:

If the UE has one or more PDU sessions configured in accordance with a specific S-NSSAI, the UE routes the user data of this application in one of the PDU sessions unless other conditions of the UE forbid the use of the PDU sessions. If the application provides a DNN, the UE determines a PDU session to be used by taking into consideration the DNN.

If the UE does not have a PDU session established based on a specific S-NSSAI, the UE requests a new PDU session corresponding to a DNN that may be provided by the S-NSSAI and application. In order for an RAN to select a suitable resource for supporting network slicing in the RAN, the RAN needs to recognize a network slice used by the UE.

When the UE triggers the establishment of a PDU session, the AMF selects an SMF in a network slice instance based on the S-NSSAI, the DNN and other information (e.g., UE subscription information and a local operator policy). The selected SMF establishes the PDU session based on the S-NSSAI and DNN.

Considerations Upon Slice Privacy

If a UE recognizes that privacy considerations are applied to an NSSAI or such a thing has been configured in the UE, in order to support the network-control privacy of slice information about a slice accessed by the UE:

The UE should not include an NSSAI in NAS signaling not having NAS security context.
The UE should not include an NSSAI in unprotected RRC signaling.

Network Slice Selection Assistance Information

A UE may include/transmit an NSSAI value in order to select a network slice (NS) in a registration process (corresponding to a conventional attach or tracking area update process). An S-NSSAI indicative of one service may include an SST (e.g., vehicle to anything (V2X), IoT, eMBB) and a slice differentiator (SD) (e.g., service provider). If a valid temporary ID (such as a GUTI) has not been received, a network selects the AMF to be first contacted based on the NSSAI. Such a determination of common control network functions (CCNF) may include determining routing based on an NSSAI in an RAN and redirecting a query to a different AMF by transmitting it from the corresponding AMF to a network slice selection function (NSSF) or a network repository function (NRF).

At least one S-NSSAI may be included in the following NSSAI set.

Configured NSSAI: a set of at least one S-NSSAI in which a UE is configured in a corresponding PLMN.

Allowed NSSAI: a set of at least one S-NSSAI actually allowed by a network with respect to a UE when registration is allowed.

Requested NSSAI: a set of at least one S-NSSAI requested by a UE through a registration request and it may be a configured, allowed NSSAI or a subset thereof.

If a UE has an allowed NSSAI that has been previously received, it may include S-NSSAIs belonging to a configured NSSAI and the allowed NSSAI in a requested NSSAI. If the UE does not have an allowed NSSAI, the UE may include S-NSSAIs present in the configured NSSAI in the requested NSSAI. A network may perform a procedure, such as subscription information check/authorization for the requested NSSAI and transmit a set of S-NSSAI(s) available for the UE to the UE as an allowed NSSAI. In this case, the transmitted allowed NSSAI may also include an S-NSSAI(s) not included in the requested NSSAI.

A UE may configure a requested NSSAI using S-NSSAI(s) to be requested by the UE in a pool of current S-NSSAIs (configured NSSAI and (recently/lately) allowed NSSAI), and may request the requested NSSAI from a network using a registration procedure. The network may configure an allowed NSSAI using S-NSSAIs allowed with respect to the UE. In such a process, the following problems may occur:

Problem 1. If a not-requested value (S-NSSAI) is provided by a network

A network may provide a UE with a new allowed NSSAI value (i.e., S-NSSAI value not requested by the UE).

For example, a UE has included an 3 S-NSSAIs (e.g., #1, #2, #3) in a requested NSSAI and requested the requested NSSAI from a network, but the network may transmit allowed NSSAIs (e.g., #1, #2, #3, #4), including an additional S-NSSAI (e.g., #4), with reference to subscription information of the UE, and transmit the allowed NSSAIs to the UE. Alternatively, although the UE has not included any S-NSSAI value in the requested NSSAI, the network may provide the UE with an allowed NSSAI including at least one S-NSSAI value based on the subscription information of the UE.

In such a case, information about an S-NSSAI newly received through an allowed NSSAI from a network may not be present in policy information (NSSP) for mapping between each application and S-NSSAI within a UE. This causes asynchronous (unsync) when a UE accesses a PLMN not a home. As a result, a situation in which the UE cannot actually use the new S-NSSAI although the new S-NASSI has been allowed with respect to the UE may occur.

Problem 2. If some of requested S-NSSAI values are not allowed

For example, a UE has requested a requested NSSAI, including 3 S-NSSAIs (e.g., #1, #2, #3), from a network, the network may not authorize/allow the request for any reason. In this case, the network may not include a non-allowed S-NSSAI value (i.e., a reject S-NSSAI value) (e.g., #2) in the allowed NSSAI (e.g., #1, #3). In this case, the network needs to notify whether a reject cause for the rejected S-NSSAI is temporary (e.g., if it can be allowed again when a specific time/place condition is satisfied) or permanent (e.g., if it cannot be allowed although a specific time/place condition is satisfied). However, a UE/network operation regarding various cases or a reject cause delivery method has not been clearly defined so far.

Problem 3. If a requested S-NSSI value and an allowed S-NSSAI value are the same (whenever registration is performed)

Although registration update (corresponding to the existing TAU) has been performed (e.g., periodical update, capability update) or a registration area has been changed for any cause within a registration area, the configuration of a supported network slice may be the same. However, in accordance with a UE operation defined in the standard so far, a UE has to include all of S-NSSAIs in a network slice/service to be used every registration procedure, request them from a network and receive permission for them. For example, if a maximum number of slices available for a UE at the same is 8, the UE and a network must request and allow the same 8 S-NSSAIs every registration procedure. This is an unnecessary information exchange and may cause the waste of resources and transmission time delay.

Accordingly, methods for solving the aforementioned problems are proposed below.

Invention Proposal 1. UE Request Policy Update Procedure

As described in Problem 1, a network may indicate a new S-NSSAI not requested by a UE as an allowed NSSAI, but the UE may not have a policy (NSSP) or rule associated with the new S-NSSAI. For example, although the UE has requested three S-NSSAIs of # A, # B and #0 as requested NSSAIs, the network may indicate an allowed NSSAI including a total of 4 S-NSSAIs, including # D, in addition to # A, # B, #0 with respect to the UE for a specific cause e.g., subscription information data update). In this case, the network has to update or add an NSSP/rule for the S-NSSAIs along with the allowed NSSAI, but the update of such an NSSP/rule may not be properly performed for a cause, such as asynchronous/mismatch between the UE and the network.

The UE may compare at least one S-NSSAI, included in a newly received allowed NSSAI, with an NSSP already owned by the UE. If, as a result of the comparison, a new S-NSSAI not present in the NSSP is found, the UE may request a corresponding policy update. A conventional technology does not include a procedure for a UE to directly request a policy update as described above.

Such a policy update request procedure of a UE may be performed based on at least one of the following three methods or a combination of them.

1-1) Policy Update Request Using a Registration Procedure

A UE may request a registration update if an NSSP update is necessary. In this case, a requested NSSAI included in a registration update request message may include all of allowed NSSAIs now owned/stored by the UE. Furthermore, the UE may indicate that the registration policy request is for a request for a registration policy update or a capability update. For example, the UE may indicate information, such as separate indicator (e.g., policy update required) for indicating type information configured as an update type/registration type and/or a registration policy update or capability update with respect to a network. In this case, the type information and/or indicator may be transmitted to the network through the registration update request message.

A UE may request the update of different policy information, not described in the present invention, from a network through this procedure.

An AMF may recognize that a registration update requested by a UE is caused by a policy update and request a policy update for the corresponding UE from the PCF. In this case, the AMF may include only an (S-)NSSAI (only an (S-)NSSAI for which a policy update is necessary or all of (S-)NSSAIs received from the UE), received from the UE in a policy update request. If the UE has requested a different type of policy information update or the AMF has determined that a different type of policy information update is necessary for the UE, the AMF may also request the update of the different type of policy information in this step.

A PCF may transmit policy information for updating the policy of the UE to the AMF based on the registration update request (more specifically, policy update request) from the AMF.

The AMF that has received the policy information transmitted by the PCF may deliver the policy information to the UE through a registration update Accept (message). In this case, the PCF may separate the policy information into information transparent to the AMF and information that may be recognized by the AMF, and may deliver them to the AMF. The AMF may deliver the transparent information to the UE by including it in the registration update Accept. And/or the AMF may transmit the same allowed NSSAI as an allowed NSSAI, provided to the UE in a previous registration procedure, to the UE (through the registration update accept).

The UE may receive the registration update accept. The UE may overwrite a previous/already stored allowed NSSAI with an allowed NSSAI newly received through the registration update accept, and may interpret the policy information and update an NSSP and/or other policy at the same time.

1-2) Policy Update Request Using a Service Request

If a UE determines that an NSSP update is necessary, it may perform a service request. If this is not the case where an UP connection is necessary, the UE does not include a PDU session ID and transmit the service request to a network. In this case, the UE may include an S-NSSAI for which an NSSP update is necessary in a service request message. Furthermore, the UE may notify the network that the service request is a request for a policy update. For example, the UE may notify the network that the service request is a request for a policy update by transmitting information, such as a request type and/or a separate indicator (e.g. policy update required) through the service request message. The UE may request the update of different policy information, not described in the present invention, through this procedure.

An AMF may recognize that the service request requested by the UE is caused by a policy update, and may request a policy update for the corresponding UE from the PCF. If the connection management (CM) state of the UE was IDLE, the AMF may perform initial context setup or N2(NG-C) connection setup at the same time. The AMF may include an (S-)NSSAI received from the UE in this request. If the UE has requested a different type of policy information update or the AMF has determined that the update of different policy information is necessary for the UE, the AMF may also request the update of different type of policy information in this step.

In this case, the CM is used to establish and release a signaling connection between the UE and the AMF. The CM includes a function of establishing and releasing a signaling connection between the UE and the AMF through N1. The signaling connection is used to enable an NAS signaling exchange between the UE and a core network. The signaling connection includes both an AN signaling connection for the UE between the UE and an AN and an N2 connection for the UE between the AN and the AMF.

The PCF may transmit policy information for updating the policy of the UE to the AMF based on a service request (more specifically, policy update request) from the AMF.

The AMF that has received the policy information delivered by the PCF may deliver policy information to the UE through registration update accept (message). In this case, the PCF may separate the policy information into information transparent to the AMF and information that may be recognized by the AMF, and may transmit them to the AMF.

The AMF may deliver the policy information, received from the PCF, to the UE through at least one of the following messages.

Generic UE configuration update command
Downlink NAS transport (for non-SM)

The UE may receive the policy information through at least one of the messages, may interpret the received policy information, and may update an NSSP and/or other policy.

1-3) A Policy Update Request Using a New Policy Update Procedure

Policy information is information different from different configuration information of a UE. The present invention is to propose a new procedure in which a UE can first request a policy update.

A UE in the CM-CONNECTED state may transmit a policy update request message to a network, if necessary. In this case, the corresponding message may include a policy type to request a policy update, and an indicator, identity and/or descriptor related to the policy type. For example, a policy update request message for updating an omitted NSSP may include an NSSP as a policy type and an S-NSSAI for which a policy update is necessary as a policy descriptor. The policy update request message may include an update request for a plurality of policies.

A UE in the CM-IDLE state may first make transition to CM-CONNECTED through a service request and then perform this procedure. Or the method proposed in 1-2) may be applied to a UE in the CM-IDLE state.

Subsequent operations of the AMF and PCF may be applied identically/likewise as in the proposals (1-1 proposal and/or 1-2 proposal). In this case, when the AMF receives policy information from the PCF and delivers the information to the UE, a generic UE configuration update command and/or downlink NAS transport (for non-SM) may be used.

The operation of the UE may also be applied identically/likewise as in the proposals (1-1 proposal and/or 1-2 proposal).

FIG. 16 is a flowchart illustrating a registration procedure according to an invention proposal 1 of this specification. In relation to this flowchart, the aforementioned description of the proposal 1 may be applied identically/likewise, and a redundant description is omitted. In the following flowchart, at least one step may be omitted or a new step may be added.

1~2. A UE may receive an allowed NSSAI from the AMF through a registration procedure (specifically, Registration Accept). In this case, if a new S-NSSAI previously not included in the UE is included in the allowed NSSAI and a policy/rule for the corresponding S-NSSAI is not present in a current NSSP, the UE may perform the operations 3a, 3b, and/or 3c.

3a. According to Invention proposal 1-1), the UE may restart a registration procedure by transmitting a registration request to the AMF. In this case, the UE may transmit information, indicating that this request is a request for a policy update, to the AMF through the registration request along with requested NSSAI values. In addition, the UE may also request an update for other policy determined to require updates.

3b. According to Invention proposal 1-2), the UE may transmit a service request to the AMF. The service request may include S-NSSAIs for which NSSP updates is necessary and a policy type for which an update is necessary.

3c. According to Invention proposal 1-3), the UE may transmit a new policy update request to the AMF. In this case, the corresponding policy update request may include a policy type for which an update is necessary and/or at least one S-NSSAI for which an NSSP update is necessary.

4~5. The AMF may request policy information from the PCF based on the requested information. The PCF delivers the policy information to the AMF, but may divide the policy information into information transparent to the AMF and information not transparent to the AMF, and deliver them to the AMF. The AMF may divide the two pieces of information and transmit them to the UE.

6a. When step 3a has been performed, the AMF may transmit a Registration Accept message to the UE. In this case, the corresponding message may include (updated) policy information along with the allowed NSSAI and may be delivered to the AMF.

6b or 6c: When steps 3b and/or 3c have been performed, the AMF may deliver the (updated) policy information to the UE using a UE configuration update command and/or a DL NAS transport message.

Invention Proposal 2. Processing of Rejected S-NSSAI

As described in Problem 2, at least some S-NSSAI of the requested NSSAIs of the UE is not allowed by a network and may not be included in the allowed NSSAI. For example, the UE has requested 3 S-NSSAIs if # A, # B and # C through a requested NSSAI, but the network may allow only the # A and # C S-NSSAIs and mat not allow the # B S-NSSAI for a specific cause (e.g., subscription information update, congestion or not co-existable). In this case, the network needs to notify the UE whether the rejection of the rejected S-NSSAI is temporary or permanent, but whether the rejection of the rejected S-NSSAI is temporary or permanent is unclear because a detailed operation thereof has not yet been defined in a current standard.

The network individually determines whether an S-NSSAI included in the requested NSSAI will be allowed. In this case, the AMF may confirm UE subscription information based on the stored UE context of the UE and/or by transmitting a query to an UDM, and may determine whether the S-NSSAI included in the requested NSSAI will be allowed. And/or the AMF may determine whether an S-NSSAI included in the requested NSSAI will be allowed through an NSSF or NRF. The network may determine whether to allow an individual S-NSSAI according to the determination procedure, and may perform a redirection procedure to a suitable AMF, if necessary.

In this case, whether an individual S-NSSAI will be allowed may be determined depending on whether the AMF supports the corresponding S-NSSAI and/or service is possible. And/or whether an individual S-NSSAI will be allowed may be determined based on an allowed S-NSSAI with respect to the corresponding UE in a PLMN. And/or whether an individual S-NSSAI will be allowed may be determined based on an allowed S-NSSAI in the current registration area of the UE.

For example, an S-NSSAI allowable with respect to the UE may have been previously configured for each current PLMN and/or registration area of the UE. In this case, if an S-NSSAI requested by the UE corresponds to an S-NSSAI allowed in the current PLMN and/or registration area of the UE, the corresponding requested S-NSSAI may be accepted/authorized. On the contrary, if an S-NSSAI requested by the UE corresponds to an S-NSSAI not allowed in the current PLMN and/or registration area of the UE, the corresponding requested S-NSSAI may be rejected.

The network may determine/identify whether an individual S-NSSAI will be allowed through such a determination procedure, and may determine an allowed NSSAI to be included in Registration Accept based on the determination/identification. In this case, if some of NSSAIs or all of S-NSSAIs requested by the UE cannot b allowed by the network (i.e., if it is rejected), the network may provide the UE with a Reject Cause (along with the allowed NSSAI).

To this end, the network may deliver reject-related information to the UE through a field/information element (IE), such as a Reject NSSAI or non-allowed NSSAI, in addition to the allowed NSSAI through the Registration Accept or registration Reject message. For example, the network may include the allowed (S-) NSSAI, rejected/non-allowed (S-) NSSAI and/or a Reject Cause in a specific field/IE within the Registration Accept or registration Reject message, and may deliver it to the UE.

A detailed operation thereof is as follows.

2-1) Permanent Reject for PLMN/UE

A UE has requested an S-NSSAI included in a configured NSSAI for a (current/entire) PLMN through a requested NSSAI, but the corresponding S-NSSAI may be rejected. In this case, if a Reject Cause for the corresponding S-NSSAI is permanent (e.g., if the corresponding S-NSSAI is (no longer) supported/served in the corresponding/current/entire PLMN or the corresponding S-NSSAI is (no longer) allowed by the subscription information of the UE), a network may specify a Reject Cause for the rejected S-NSSAI (e.g., a not allowed S-NSSAI, a not-supported S-NSSAI, or an S-NSSAI not available in the current/entire PLMN). That is, the network (specifically, AMF) may transmit rejected one or more S-NSSAIs and a Reject Cause t the UE.

Additionally, the network may notify the UE that the network transmitting Reject is an HPLMN and whether this rejection is for a current PLMN or the entire PLMN in detail upon permanent rejection.

The network may perform a configuration update, such as that an S-NSSAI that is being used is mapped/overwritten with other S-NSSAIs. To this end, a previously used S-NSSAI needs to be changed into other S-NSSAIs. In this case, the network may provide the UE with -NSSAI information that needs to be additionally mapped/overwritten along with permanent reject for the requested S-NSSAI.

If the requested S-NSSAI of the UE included in the configured NSSAI is rejected along with a permanent Reject Cause, the UE may delete the rejected S-NSSAI from the configured NSSAI (list). If the configured NSSAI is configured in a PLMN unit and the network notifies the UE that the S-NSSAI has been (permanently) rejected in a PLMN unit, the UE may delete a (permanently) rejected S-NSSAI only from a configured NSSAI (list) for a current PLMN. On the contrary, if an S-NSSAI has been (permanently) rejected with respect to all PLMNs, that is, the UE itself, the UE may delete the (permanently) rejected S-NSSAI from all of configured NSSAIs (list) included in each current PLMN.

And/or, if the requested S-NSSAI of the UE has been rejected along with a permanent Reject Cause, it may be included in a specific list (e.g., a forbidden/rejected list of a rejected NSSAI) and managed as a rejected S-NSSAI.

If a configured NSSAI owned by a UE is for all PLMNs or multiple PLMNs, the UE may operate as follows.

If a network has notified the UE that a permanent Reject is for all PLMNs, the UE deletes a permanently rejected S-NSSAI from a configured NSSAI (list) for all/multiple PLMNs. If the network has notified the UE that a permanent Reject is for a current PLMN, likewise, the UE may delete a permanently rejected S-NSSAI from a configured NSSAI (list for corresponding all/multiple PLMNs).

As another method, a UE may separate and manage a configured NSSAI (list) for all/multiple PLMNs. For example, the UE may separate the configured NSSAI (list) into a configured NSSAI (list) for a current PLMN and a configured NSSAI (list) for the remaining PLMNs except the current PLMN. If an S-NSSAI has been permanently rejected, the UE may delete a permanently rejected S-NS-SAI from only the configured NSSAI (list) for a current PLMN, but maintain the permanently rejected S-NSSAI in other configured NSSAIs (list).

If newly mapped/substituted S-NSSAI information has been indicated in a network with respect to a permanently rejected S-NSSAI, a UE may add the indicated new S-NS-SAI to a configured NSSAI (list) (i.e., the permanently rejected S-NSSAI is substituted with the newly indicated/allowed S-NSSAI in the configured NSSAI (list)) while deleting a previous S-NSSAI when updating the configured NSSAI (list). In this case, a task for mapping a policy for the previous S-NSSAI to the new S-NSSAI on the NSSP may be performed.

After the procedure is performed, the UE can no longer request the (permanently) rejected S-NSSAI from the network (i.e., the UE may not attempt to use the (permanently) rejected S-NSSAI) in a next registration procedure. In this case, If the S-NSSAI rejection has been performed/indicated in a PLMN unit, the UE may request the corresponding S-NSSAI from the network (i.e., the UE may attempt to use the (permanently) rejected S-NSSAI) in another PLMN other than a PLMN in which the S-NSSAI has been permanently rejected.

2-2) Rejection for a Specific Area

When a network determines whether to allow S-NSSAIs requested by a UE, the network may use the current location (e.g., served location)/area (e.g., current registration area) of the UE as criteria for determination. There may be a case where the use of a specific slice in a specific location/area/region is impossible or the use of a slice is possible only in a specific location/area/region regardless of whether to allow a slice in a PLMN. For example, in the case of the local area network slice, the UE may be connected to a slice that may be served only within a specific registration area or a configured area over a local area data network (LADN).

If the network rejects an S-NSSAI for a specific location/area/region (e.g., registration area or AMF area) for such a reason, the network may provide the UE with such a Reject Cause (e.g., the S-NSSAI is not available in a current registration area). For example, the network may provide the UE with a Reject Cause including/indicating an S-NSSAI not allowed/available in a current registration area or an S-NSSAI not allowed/available in a current LADN area.

To this end, the network may deliver rejection-related information to the UE through a field/information element (IE), such as a Reject NSSAI or non-allowed NSSAI, in addition to an allowed NSSAI through a Registration Accept or registration Reject message. For example, the network may include an allowed (S-)NSSAI, a rejected/non-allowed (S-)NSSAI and/or a Reject Cause in a specific field/IE within the Registration Accept or registration Reject message, and may deliver the message to the UE.

If the S-NSSAI has been rejected in a specific location/area/region as described above, the UE may manage the rejected S-NSSAI as a separate list. The list may have a form, such as a temporary Reject NSSAI, an NSSAI restriction list or a rejected/forbidden NSSAI. The UE may write/store a Reject/restriction cause (e.g., a local area/registration area/AMF) for each rejected S-NSSAI and/or descriptor/identity information thereof (e.g., an LADN corresponding to the rejected S-NSSAI, a registration area ID, the AMF ID) in the list. If restriction/reject in a specific area is not permanent, the UE may also write/store/include such information in the list. An example of the list is described in 2-5 to be described later.

If a UE has moved to a new area/location/region (i.e., if the UE has deviated from a current registration area in which an S-NSSAI has been rejected), the UE may check whether the reattempt of a request for the S-NSSAI rejected in the area/location/region before the movement is possible with reference to the list (i.e., rejected/forbidden NSSAI). For example, if the rejection of an S-NSSAI is given in a registration Area Unit and the UE has Moved to Another Registration Area (i.e., if the UE has deviated from a current registration area in which the S-NSSAI has been rejected), the UE may reattempt a request to use the S-NSSAI rejected in the previous registration area in the new registration area. Furthermore, if the S-NSSAI rejected in the current PLMN is deleted from the list (i.e., rejected/forbidden NSSAI) for any reason, the UE may request the corresponding S-NSSAI again although it does not deviate from the current registration area.

2-3) Temporary Rejection

A network may reject an S-NSSAI requested by a UE at a specific occasion regardless of an area or geographical unit. The reason for this is the congestion of a specific entity, a temporary obstacle and/or a service agreement (e.g., a slice agreed to provide services only in a specific time zone). In this case, the network may specify a cause for the S-NSSAI rejection in the UE and may additionally use a backoff mechanism at the same time. The backoff mechanism may be implemented in the form of a descriptor (e.g., timer #1: 1 s~16 s, timer #2: 16 s~32 s, timer #3: 32 s~64 s . . . ) indicative of a specific time interval for backoff in order to reduce the amount of information used by a network in order to explicitly indicate or deliver a backoff timer value for each S-NSSAI in a UE. Alternatively, the backoff mechanism may be implemented in a form in which a network simply transmits an indicator indicative of backoff to a UE.

When the UE receives configuration information for the backoff mechanism along with a Reject Cause, it may perform the backoff mechanism based on the corresponding configuration information. For example, the UE may not request a requested NSSAI for an S-NSSAI, rejected when a timer value was received, until a timer expires. If the UE has received a timer range, it may randomly perform the backoff mechanism within a predetermined range. If the UE has received an indicator simply indicative of backoff, it may randomly determine a backoff time within a previous/preconfigured or previous/predetermined range and perform the backoff mechanism.

2-4) Slice Co-Existence Case

There may be a case where one AMF cannot server all of multiple S-NSSAIs requested by a UE at the same time. For example, if the AMF1 can support #1, #2 and #4 S-NSSAIs and the AMF2 can support #2, #3 and #5 S-NSSAIs, when a UE requests the #1, #2 and #3 S-NSSAIs as requested NSSAIs, a network may have to reject the #3 S-NSSAI (i.e., AMF1 selection) or the #1 S-NSSAI (i.e., AMF2 selection) depending on AMF selection. That is, the network may perform rejection for a specific S-NSSAI depending on a supportable S-NSSAI of a selected serving AMF. Accordingly, in this case, if the UE has moved to a different registration area or a different AMF has been selected, the UE needs to be able to request a rejected S-NSSAI again.

Or there may be a case where the AMF may serve all of S-NSSAIs requested by a UE, but specific S-NSSSAIs are configured by a network operator so that the specific S-NSSAIs cannot be served/used at the same time. For example, a specific AMF can support both #1 and #2 slices/S-NSSAIs, but the two slices/S-NSSAIs may be configured so that only one of them can be used. As a result, although a PDU session for the #1 slice/S-NSSAI has been generated when a PDU session is generated, if a PDU session for the #2 slice/S-NSSAI has to be generated, the existing PDU session for the #1 slice/S-NSSAI may need to be released.

If the network determines such co-existence information and determines an S-NSSAI to be allowed (at a current occasion) and an S-NSSAI to be not allowed, it may provide the UE with Reject-related information with respect to the S-NSSAI to be not allowed. That is, the network may provide the UE with information (e.g., not co-existable with other S-NSSAIs) indicating that a Reject Cause for (currently) rejected S-NSSAIs is not co-existable with other S-NSSAIs. In this case, the network may notify the UE of a not-co-existable target S-NSSAI. Furthermore, the network may indicate information about a not-co-existable granularity/unit additionally/selectively (e.g., in the AMF unit, registration area unit and/or service providing unit (i.e., the information indicates that an S-NSSAI is allowed, but the simultaneous use of a target S-NSSAI is impossible in the corresponding unit)).

If at least some S-NSSAIs have been rejected due to co-existence, the UE may manage this through a specific list (e.g., a non-allowed NSSAI, an NSSAI restriction list or a rejected/forbidden list). More specifically, the UE may include the rejected S-NSSAIs in the specific list and manage them. In this case, the UE may also manage a Reject Cause, a not-co-existable granularity/unit and/or not-co-existable target S-NSSAI information indicating that the rejected S-NSSAIs is due to impossible co-existence through the corresponding specific list.

If a condition is changed (e.g., if the AMF that has temporarily rejected an S-NSSAI for a cause of simultaneous support impossibility changes into another AMF for a cause, such as a registration area change of a UE), the UE may request/attempt a slice/service for the rejected S-NSSAI again. And/or in this case, if the UE is served through an S-NSSAI now present in an allowed NSSAI, the UE may request a new S-NSSAI by taking into consideration the state in which the current served service will be soon stopped in such a state.

2-5) Management of "Non-Allowed/NSSAI Restricted/Rejected/Forbidden" NSSAI List

As proposed in Inventions 2-2, 2-3 and 2-4, a UE may manage a Reject Cause of an individual S-NSSAI provided by a network in a list form, and may manage based on information, such as a specific area or time/in a unit. If a restriction condition (or current condition) is changed, the UE may make a service request for a rejected S-NSSAI (i.e., an S-NSSAI included and managed in a corresponding list) again. To this end, the UE may first delete an S-NSSAI to be requested again from the corresponding list. A configuration and embodiment of the list may be the same as below.

TABLE 3

| S-NSSAI | Restriction type | Restriction descriptor | Restriction duration |
| --- | --- | --- | --- |
| #001 | Registration Area | RA ID xxx | Permanent |

TABLE 3-continued

| S-NSSAI | Restriction type | Restriction descriptor | Restriction duration |
| --- | --- | --- | --- |
| #010 | Congestion | SMF ID; PDU session ID; or DNN/APN; | Timer Txxxx |
| #011 | Co-existence | Current AMF/#009 | — |

FIG. 17 is a flowchart illustrating a registration procedure according to Invention Proposal 2 of this specification. In relation to this flowchart, the aforementioned description Proposal 2 may be applied identically/likewise, and a redundant description is omitted. In the following flowchart, at least one step may be omitted or a new step may be added.

1. A UE requests a requested NSSAI through a registration procedure. To this end, the UE may transmit the requested NSSAI to the AMF through a registration request.

2. The AMF may perform authorization check for the NSSAI requested by the UE through a query with other network functions, such as its own context information and/or NSSF, an NRF, and UDM. In this case, the authorization check may be performed in an S-NSSAI unit.

3. The AMF may transmit non-allowed/rejected NSSAI information, including non-allowed S-NSSAIs (i.e., rejected S-NSSAIs), a Reject Cause and/or Reject-related additional information in addition to an allowed NSSAI, to the UE.

4a. If an S-NSSAI included in a configured NSSAI has been permanently rejected with respect to a corresponding/current PLMN or all of PLMNs, the UE may update a configured NSSAI list. For example, the UE may remove/delete the rejected S-NSSAI from the configured NSSAI list.

4b. If an S-NSSAI has not been permanently rejected, but has been temporarily rejected due to each PLMN, each area, a specific time (e.g., backoff time) and/or impossible co-existence with other S-NSSAIs, the UE may update a "non-allowed/NSSAI restricted/rejected/forbidden" NSSAI list for managing them.

5. A restriction condition (or the current situation/condition of the UE) of the restriction list updated in 4b step may be changed, and thus restriction may be alleviated (e.g., the UE moves to another registration area or a backoff timer expires)

6a/6b. The UE may include the previously rejected S-NSSAI in a registration request and start a registration procedure again. If rejection based on an area has been received, the UE may transmit a request to a new AMF changed due to the AMF change event.

Invention Proposal 3. Method of Continuously Using S-NSSAI

In relation to Problem 3, although a UE has received an allowed NSSAI through a previous registration procedure, it needs to newly receive an allowed NSSAI by requesting a requested NSSAI in each registration procedure (e.g., mobility registration update, periodical registration update).

If a registration area is changed and a registration update is to be performed (mobility registration update), the UE has to include all of S-NSSAIs to be used in a requested NSSAI because the registration area has been changed. If a network can allow all of requested NSSAIs, the network may include all of S-NSSAIs in an allowed NSSAI and transmit them. Alternatively, the network may include only information/indication indicating that "all of the requested NSSAI values are allowed" in an allowed NSSAI instead of including all of S-NSSAIs in the allowed NSSAI and transmitting them, ad may transmit the information/indication. For example, if the UE requests #1, #2, #3 and #4 S-NSSAIs/slices and the network allows all of the #1, #2, #3 and #4 S-NSSAIs/slices, the network may include only a value, indicating that "all of the requested NSSAI values are allowed", instead of including each of the allowed #1, #2, #3 and #4 S-NSSAIs/slices values in an allowed NSSAI one by one. The present embodiment cannot be used/applied I any one of requested NSSAIs is rejected. Accordingly, there are advantages in that a procedure becomes very simple and signaling overhead is reduced.

If all of S-NSSAIs included in a requested NSSAI are allowed and a new S-NSSAI value is also indicated, the network may include a new S-NSSAI value in an allowed NSSAI along with information/indication indicating that "all of requested NSSAI values are allowed", and may transmit it to the UE.

FIG. 18 is a flowchart illustrating a policy update procedure/method of a UE according to Proposal 1 of the present invention. In relation to this flowchart, the aforementioned embodiments and description may be applied identically/likewise, and a redundant description is omitted. Furthermore, in this flowchart according to embodiments, some steps may be omitted or a new step may be added.

First, the UE may transmit a first registration request message to the AMF (S1810). In this case, the first registration request message may include a requested NSSAI including an S-NSSAI corresponding to a network slice for which the UE wants registration.

Next, the UE may receive a first Registration Accept message from the AMF as a response to the first registration request message (S1820). In this case, the first Registration Accept message ㅌ may include an allowed NSSAI including at least one S-NSSAI allowed by the AMF.

Next, if a new S-NSSAI not included in the requested NSSAI is included in the allowed NSSAI and an NSSP associated with the updated of the new S-NSSAI is not present, the UE may request the updated of the NSSP associated with the new S-NSSAI from the AMF (S1830).

The AMF may be a network node that transmits a policy update request message for the update of the NSSP to the policy control function (PCF) in response to the request of the UE. A PCF may be a network node that delivers a policy update message, including NSSP update information about the new S-NSSAI, to the AMF in response to the request of the AMF. In this case, the policy update request message may include the new S-NSSAI for which an update is requested and/or a policy type.

In one embodiment, the step of requesting the update of the NSSP associated with the new S-NSSAI from the AMF may correspond to the step of transmitting a second registration request message, including the "new S-NSSAI" and a "registration type configured as a policy update type or indicator indicative of a policy update", to the AMF. In this case, the requested NSSAI included in the second registration request message may be constructed/configured to include all of allowed NSSAIs stored in the UE. Furthermore, the NSSP update information transmitted by the PCF may be transmitted to the UE through a second registration reception message that is a response message for the second registration request message. Furthermore, although not shown in the flowchart, the UE may update the NSSP for the new S-NSSAI based on the NSSP update information received through the second registration request message.

In another embodiment, the step of requesting the update of the NSSP associated with the new S-NSSAI from the AMF may correspond to the step of transmitting a service request or policy update request message, including the "new S-NSSAI" and "request type configured as the policy update type or indicator indicative of the policy update", to the AMF. If the update request of the NSSP is transmitted through a service request message and the UE that has transmitted the service request message is in a CM-IDLE state, the AMF may perform initial context setup or N2 connection setup for making transition the UE to a CM-CONNECTED state. The transmission of the update request of the NSSP through the policy update request message may be restricted to a case where the CM state of the UE is the CM-CONNECTED state. That is, restriction may be applied so that only a UE in the CM-CONNECTED state is capable of an update request for the NSSP through a policy update request message. The NSSP update information transmitted by the PCF may be transmitted to the UE through a generic UE configuration update command message or a downlink NAS transport message.

FIG. 19 is a flowchart illustrating a registration procedure/method of a UE according to the proposal 2 of the present invention. In relation to this flowchart, the aforementioned embodiments and description may be applied identically/likewise, and a redundant description is omitted. Furthermore, in this flowchart according to embodiments, some steps may be omitted or a new step may be added.

First, the UE may transmit a registration request message to the AMF (S1910). In this case, the registration request message may include a requested NSSAI including an S-NSSAI corresponding to a network slice for which the UE wants registration. The requested NSSAI may include at least some of S-NSSAIs configured (for a PLMN) if the UE has not previously stored an allowed NSSAI (for the PLMN). That is, the requested NSSAI may be included in/may correspond to the configured NSSAI for the PLMN or a subset of the configured NSSAI. Furthermore, the requested NSSAI may include at least some of allowed S-NSSAIs (for the PLMN) if the UE has previously stored the allowed NSSAI (for the PLMN). That is, the requested NSSAI may be included in/may correspond to the allowed NSSAI for the PLMN or a subset of the allowed NSSAI.

Next, the UE may receive a Registration Accept message from the AMF as a response to the registration request message (S1920). In this case, if at least one of S-NSSAIs included in the requested NSSAI has been rejected by the AMF, the Registration Accept message may include a Reject Cause for the rejected S-NSSAI along with the rejected S-NSSAI. In this case, the Reject Cause may be configured to indicate that the rejected S-NSSAI is not available in the PLMN and/or a current registration area. In this case, the PLMN may correspond to a current PLMN or the entire PLMN of the UE. Furthermore, the Registration Accept message may include an allowed NSSAI including the allowed S-NSSAI if the remaining S-NSSAIs except the rejected S-NSSAI from among the S-NSSAIs included in the requested NSSAI are allowed by the AMF.

Meanwhile, although not shown in this flowchart, the UE may store the rejected S-NSSAI in memory as a rejected NSSAI based on the Reject Cause. If the S-NSSAI has been rejected for a cause in which the rejected S-NSSAI is not available in the PLMN, the UE may not attempt a use/registration request for the corresponding rejected S-NSSAI in the PLMN until the rejected S-NSSAI is deleted from the rejected NSSAI that is being stored. Or if the S-NSSAI has been rejected for a cause in which the rejected S-NSSAI is not available in a current registration area, the UE may not attempt a use request for the corresponding rejected S-NSSAI in the current registration area until the UE deviates from the registration area.

Apparatus to which the Present Invention May be Applied

FIG. 20 illustrates a block diagram of a communication apparatus according to an embodiment of the present invention.

Referring to FIG. 20, a wireless communication system includes a network node 2010 and a plurality of UEs (UE) 2020.

The network node 2010 includes a processor 2011, a memory 2012, and a communication module 2013. The processor 2011 implements the previously proposed functions, processes and/or methods. The layers of the wired/wireless interface protocol may be implemented by the processor 2011. The memory 2012 is connected to the processor 2011 and stores various information for driving the processor 2011. The communication module 2013 is connected to the processor 2011 to transmit and/or receive a wired/wireless signal. Some examples of the network node 2010 may include a base station, an MME, an HSS, an SGW, a PGW, and an application server. In particular, when the network node 2010 is a base station, the communication module 2013 may include a radio frequency unit for transmitting/receiving a radio signal.

The UE 2020 includes a processor 2021, a memory 2022 and a communication module (or RF section). Processor 2021 implements the previously proposed functions, processes and/or methods. The layers of the wireless interface protocol may be implemented by the processor 2021. The memory 2022 is connected to the processor 2021 and stores various information for driving the processor 2021. The communication module 2023 is coupled to processor 2021 to transmit and/or receive wireless signals.

The memories 2012 and 2022 may be located inside or outside the processors 2011 and 2021 and may be coupled to the processors 2011 and 2021 by various well known means. Also, the network node 2010 (in the case of a base station) and/or the UE 2020 may have a single antenna or multiple antennas.

FIG. 21 shows a block diagram of a communication apparatus according to an embodiment of the present invention.

Specifically, FIG. 21 is a more detailed diagram of the UE of FIG. 20.

Referring to FIG. 21, the UE may include a processor (or digital signal processor (DSP)) 2110, an RF module (or RF unit) 2135, a power management module 2105, an antenna 2140, a battery 2155, a display 2115, a keypad 2120, memory 2130, a subscriber identification module (SIM) card 2125 (this element is optional), a speaker 2145 and a microphone 2150. The UE may also include a single antenna or multiple antennas.

The processor 2110 implements the functions, processes and/or methods proposed above. The layers of a radio interface protocol may be implemented by the processor 2110.

The memory 2130 is connected to the processor 2110 and stores information related to the operation of the processor 2110. The memory 2130 may be located inside or outside the processor 2110 and may be connected to the processor 2110 by well-known various means.

A user inputs command information, such as a telephone number, by pressing (or touching) a button of the keypad 2120 or by voice activation using the microphone 2150, for example. The processor 2110 processes a proper function, such as receiving such command information or making a call to a telephone number, so that the function is performed. Operational data may be extracted from the SIM card 2125 or the memory 2130. Furthermore, the processor 2110 may display command information or driving information on the display 2115 so that a user can recognize the information or for convenience.

The RF module 2135 is connected to the processor 2110 and transmits and/or receives RF signals. The processor 2110 transfers command information to the RF module 2135 so that a radio signal forming voice communication data, for example, is transmitted in order to initiate communication. The RF module 2135 includes a receiver and a transmitter in order to transmit and receive radio signals. The antenna 2140 functions to transmit and receive radio signals. When the RF module 2135 receives a radio signal, it transfers the signal for the processing of the processor 2110 and may convert the signal into a baseband. The processed signal may be converted into audible or readable information through the speaker 2145.

In the aforementioned embodiments, the elements and characteristics of the present invention have been combined in specific forms. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the present invention. Order of the operations described in the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present invention may be implemented by various means, for example, hardware, firmware, software or a combination of them. In the case of an implementation by hardware, the embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present invention may be implemented in the form of a module, procedure or function for performing the aforementioned functions or operations. Software code may be stored in the memory and driven by the processor. The memory may be located inside or outside the processor and may exchange data with the processor through a variety of known means.

In this specification, 'A and/or B' can be interpreted to mean 'at least one of A and(or) B.'

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

Although the present invention has been described based on an example in which it is applied to the 3GPP LTE/LTE- A/NR(5G) system, but may be applied to various wireless communication systems in addition to the 3GPP LTE/LTE-A/NR(5G) system.

The invention claimed is:

1. A method for a user equipment to update a policy in a wireless communication system, the method comprising:
   transmitting a first registration request message to an access and mobility management function (AMF), wherein the first registration request message comprises requested network slice selection assistance information (NSSAI) comprising single (S)-NSSAI corresponding to a network slice with which the user equipment wants to register;
   receiving a first registration accept message as a response to the first registration request message from the AMF, wherein the first registration accept message comprises allowed NSSAI comprising at least one S-NSSAI allowed by the AMF; and
   requesting an update of a network slice selection policy (NSSP) associated with new S-NSSAI from the AMF when the new S-NSSAI not included in the requested NSSAI is included in the allowed NSSAI and the NSSP associated with the new S-NSSAI is not present,
   wherein the AMF is a network node for transmitting a policy update request message for the update of the NSSP to a policy control function (PCF) in response to a request from the user equipment, and
   wherein the PCF is a network node for delivering a policy update message comprising NSSP update information about the new S-NSSAI to the AMF in response to a request from the AMF.

2. The method of claim 1, wherein the policy update request message comprises the new S-NSSAI to request update and/or a policy type.

3. The method of claim 1, wherein the requesting the update of the NSSP associated with the new S-NSSAI from the AMF comprises transmitting a second registration request message comprising "the new S-NSSAI" and "a registration type configured to a policy update type or an indicator indicative of a policy update" to the AMF.

4. The method of claim 3, wherein the requested NSSAI included in the second registration request message comprises all of allowed NSSAI stored in the user equipment.

5. The method of claim 4, wherein the NSSP update information transmitted by the PCF is transmitted to the user equipment through a second registration reception message which is a response message to the second registration request message.

6. The method of claim 5, further comprising updating the NSSP for the new S-NSSAI based on the NSSP update information received through the second registration request message.

7. The method of claim 1, wherein the requesting the update of the NSSP associated with the new S-NSSAI from the AMF comprises transmitting a service request or policy update request message comprising "the new S-NSSAI" and "a request type configured to a policy update type or an indicator indicative of a policy update" to the AMF.

8. The method of claim 7, wherein, when the update request of the NSSP is transmitted through the service request message and the user equipment which transmits the service request message is in a connection management (CM)-IDLE state, the AMF is a network node performing initial context setup or N2 connection setup for the user equipment.

9. The method of claim 7, wherein the transmission of the update request of the NSSP through the policy update request message is limited to a case where a connection management (CM) state of the user equipment is a CM-CONNECTED state.

10. The method of claim 7, wherein the NSSP update information transmitted by the PCF is transmitted to the user equipment through a generic user equipment configuration update command message or a downlink non-access stratum (NAS) transport message.

11. A user equipment for performing policy update in a wireless communication system, the user equipment comprising:
    a transceiver configured to transmit and receive signals; and
    a processor configured to control the transceiver,
    wherein the processor is further configured to:
    transmits a first registration request message to an access and mobility management function (AMF),
    wherein the first registration request message comprises requested network slice selection assistance information (NSSAI) comprising single (S)-NSSAI corresponding to a network slice with which the user equipment wants to register,
    receive a first registration accept message as a response to the first registration request message from the AMF,
    wherein the first registration accept message comprises allowed NSSAI comprising at least one S-NSSAI allowed by the AMF, and
    request an update of a network slice selection policy (NSSP) associated with new S-NSSAI from the AMF when the new S-NSSAI not included in the requested NSSAI is included in the allowed NSSAI and the NSSP associated with the new S-NSSAI is not present,
    wherein the AMF is a network node for transmitting a policy update request message for the update of the NSSP to a policy control function (PCF) in response to a request from the user equipment, and
    wherein the PCF is a network node for delivering a policy update message comprising NSSP update information about the new S-NSSAI to the AMF in response to a request from the AMF.

12. The user equipment of claim 11, wherein the policy update request message comprises the new S-NSSAI to request update and/or a policy type.

* * * * *